United States Patent
Rao et al.

(10) Patent No.: US 8,504,818 B2
(45) Date of Patent: Aug. 6, 2013

(54) METHOD AND SYSTEM FOR RELIABLE PROTOCOL TUNNELING OVER HTTP

(75) Inventors: Deepak Rao, Bellevue, WA (US); Lei Tan, Redmond, WA (US); Xin Guo, Mill Creek, WA (US)

(73) Assignee: Microsoft Corporation, Redmond, WA (US)

( * ) Notice: Subject to any disclaimer, the term of this patent is extended or adjusted under 35 U.S.C. 154(b) by 371 days.

(21) Appl. No.: 12/845,620

(22) Filed: Jul. 28, 2010

(65) Prior Publication Data

US 2011/0258432 A1 Oct. 20, 2011

Related U.S. Application Data

(60) Provisional application No. 61/324,723, filed on Apr. 15, 2010.

(51) Int. Cl.
*H04L 29/00* (2006.01)

(52) U.S. Cl.
USPC ........... 713/150; 713/151; 713/152; 709/225; 709/226; 709/229

(58) Field of Classification Search
USPC .................. 713/151–152; 709/225–226, 229
See application file for complete search history.

(56) References Cited

U.S. PATENT DOCUMENTS

| | | | |
|---|---|---|---|
| 6,412,009 B1 | 6/2002 | Erickson et al. | |
| 7,010,688 B1 | 3/2006 | Kawasaki | 713/168 |
| 7,562,146 B2 | 7/2009 | Panasyuk et al. | 709/227 |
| 2002/0083191 A1* | 6/2002 | Ryuutou et al. | 709/237 |
| 2003/0079020 A1 | 4/2003 | Gourraud et al. | 709/227 |
| 2003/0217149 A1 | 11/2003 | Crichton et al. | |
| 2005/0125663 A1* | 6/2005 | Funk | 713/168 |
| 2005/0267946 A1 | 12/2005 | An et al. | 709/217 |
| 2007/0005734 A1* | 1/2007 | Abdo | 709/219 |
| 2007/0094723 A1 | 4/2007 | Short et al. | 726/14 |
| 2007/0113085 A1 | 5/2007 | Naslund et al. | 713/168 |
| 2008/0043760 A1* | 2/2008 | Venkatraman et al. | 370/401 |
| 2008/0077788 A1 | 3/2008 | Jain et al. | 713/151 |
| 2009/0177784 A1 | 7/2009 | Olson et al. | 709/228 |

OTHER PUBLICATIONS

Hallivuori, Ville, Helsinki University of Techonology, "Real-time Transport Protocol (RTP) securtiy," 2000, [retrieved from: http://www.tml.tkk.fi/Opinnot/Tik-110.501/2000/papers/hallivuori.pdf], (12 pp.).

International Search Report and Written Opinion cited in International Application No. PCT/US2011/031103 mailed Dec. 26, 2011.

* cited by examiner

*Primary Examiner* — Ghazal Shehni
(74) *Attorney, Agent, or Firm* — Merchant & Gould

(57) ABSTRACT

The embodiments described herein generally relate to methods and systems for tunneling arbitrary binary data between an HTTP endpoint and an arbitrary destination. Such tunneling of data is valuable in an environment, for example, in which a browser-based client communicates in the HTTP protocol and desires to exchange data with a remote endpoint understanding non-HTTP communications. A relay server is used as a "middle man" to connect the client to the destination, and components supporting the necessary protocols for data exchange are plugged into the relay server. To achieve reliable and ordered transmission of data, the relay server groups sessions through the assignment of session identifiers and tracks the exchange of messages through the assignment of sequence and acknowledgment numbers. Further, the relay server provides for authenticating the HTTP endpoint with the destination and for handling other operations not available in the constrained environment of the Web-based client.

20 Claims, 13 Drawing Sheets

METHOD AND SYSTEM FOR RELIABLE PROTOCOL TUNNELING OVER HTTP

CROSS-REFERENCE TO RELATED APPLICATION

This application claims the benefit of U.S. Provisional Application Ser. No. 61/324,723, filed on Apr. 15, 2010, and entitled, "METHOD AND SYSTEM FOR RELIABLE PROTOCOL TUNNELING OVER HTTP." The entirety of the aforementioned application is incorporated herein by reference.

BACKGROUND

Web conferencing has become an increasingly useful tool for conducting live meetings, presentations, training seminars, etc., over the Internet, or World Wide Web. In a typical Web conference, multiple participants in the conference are connected to each other over the Internet from their personal computers. An example software platform for providing Web conferencing capabilities is MICROSOFT COMMUNICATIONS SERVER produced by MICROSOFT Corporation of Redmond, Wash. Where a client desires to join an online meeting but does not have Office Communicator, for example, installed on the client computer, an AJAX-based ("Asynchronous JavaScript and XML") Communicator Web Access (CWA) client is typically used to enable the client to join the meeting. While an AJAX-based CWA client is able to join the meeting, the client experience is constrained by the functionality available via Javascript.

To improve the meeting experience of a browser-based client without requiring explicit installation of a client application, a different type of client from the AJAX-based CWA client may be used. For example, a SILVERLIGHT-based client may be used as derived from the MICROSOFT SILVERLIGHT platform produced by MICROSOFT Corporation of Redmond, Wash. SILVERLIGHT enables the development of feature-rich applications that are nearly on par with native applications, both in terms of functionality as well as the underlying protocol used to communicate with the server. However, a SILVERLIGHT-type platform may still have some limitations in being able to develop such an application. For example, the browser-based client typically does not support a Transmission Control Protocol (TCP) socket connection to the remote server(s) providing Web meeting conference capabilities. Such socket connections are not made possible based on the heightened security features inherent in the corporate networks of the client, in which policy file retrieval is prevented due to restricted ports and the overall inability to traverse firewalls. Indeed, restricted network connectivity exists in such situations as firewalled networks, networks behind proxy servers, etc. Without a policy file, the browser-based client rejects the opening of a socket connection to a remote server. Further, access to certain security packages such as NT LAN Manager (NTLM) authentication, Kerberos authentication protocol, or certificate authentication may not be available to the application. Without such authentication capabilities, the browser-based client cannot be admitted to a Session Initiation Protocol (SIP) server using the same protocol as a native client.

Although specific problems have been addressed in this Background, this disclosure is not intended in any way to be limited to solving those specific problems.

SUMMARY

Embodiments generally relate to providing a rich meeting experience and improved functionality for a Web-based client by leveraging a server entity to act as a "middle man" for connecting the Web-based client with a remote endpoint, e.g., remote server(s), in the meeting platform without requiring any changes to the remote server(s). Such a "middle man" server is referred to as a "relay server," for example. Embodiments thus provide for enabling a client in a restricted environment to extend its functionality by connecting to, and thus leveraging the functionality of, the relay server. The relay server, in turn, has functionality associated with its environment, such as a Windows platform, for example. A Web-based client typically uses Hypertext Transfer Protocol (HTTP) or Hypertext Transfer Protocol Secure (HTTPS) for communications and exchange of data in a Web environment. The description of the embodiments below refers to "HTTP." However, as those of skill in the art would appreciate, such embodiments include "HTTPS" when references to "HTTP" are made. Where a remote server in a meeting platform, such as a MICROSOFT OFFICE COMMUNICATIONS server ("OCS server"), has an existing protocol of communications that is not HTTP-based, for example, the use of a relay server permits the exchange of data between the Web-based client and the remote server(s) by tunneling arbitrary binary data, or arbitrary protocol data, over HTTP between the client, or HTTP-endpoint, and the remote server, or other arbitrary destination. Embodiments thus provide for the tunneling of any arbitrary data over HTTP. For example, embodiments provide for the following example usages of the relay server for reliable protocol tunneling over HTTP: tunneling any data over HTTP onto Real-Time Transport Protocol (RTP)/Secure Real-Time Transport Protocol (SRTP); tunneling Remote Desktop Protocol (RDP) over HTTP onto any transport mechanism (TCP or User Datagram Protocol (UDP), for example); tunneling RDP over HTTP onto RTP/SRTP; tunneling SIP over HTTP solution, etc.

Because the HTTP is a simple request/response protocol, it supports multiple connections from a client to a server and therefore does not guarantee ordered delivery of request and response messages. Reliable delivery of messages is also not guaranteed given that request and response messages can be dropped in transmission of the messages. For example, an intermediate HTTP proxy may drop an HTTP response. The reliable and ordered organization and delivery of messages is valuable to a Web conference environment. As such, embodiments of the present disclosure provide for session identifiers to be used to group requests that belong to the same relay session. Further, the reliable and ordered delivery of messages is achieved by restricting requests to one pending upstream request and one pending downstream request at a time. Embodiments also provide for sequence/acknowledgment numbers to be used to ensure the detection of lost messages and the re-sending of lost data. Negative HTTP responses are also treated in embodiments to re-try requests to promote robust, e.g., lossless, data transmission over HTTP and system resiliency. In addition, embodiments provide for platform services as part of the relay server, in which such platform services include, for example, performance of general cryptographic operations, Domain Name Service (DNS) operations, and the use of an authentication broker to assist the Web-based client in computing an authentication handshake with a destination in the meeting environment. Further yet, embodiments provide for the system components to be pluggable in nature and to thus extend the functionality of the Web-based client. For example, arbitrary protocol tunneling is achieved, according to embodiments, by having a pluggable transport component on the relay server. This pluggable transport component enables the use of Transport Layer Security (TLS)/Secure Sockets Layer (SSL) transport in SIP tunneling, while, on the other hand, SRTP transport is used in RDP tunneling, for example. Further, the pluggable nature of the platform services component allows a client to perform SIP authentication using the authentication broker, in accordance with an embodiment of the present disclosure.

This Summary is provided to introduce a selection of concepts in a simplified form that is further described below in the Detailed Description. This Summary is not intended to identify key or essential features of the claimed subject matter, nor is it intended to be used in any way as to limit the scope of the claimed subject matter.

BRIEF DESCRIPTION OF THE DRAWINGS

Embodiments of the present disclosure may be more readily described by reference to the accompanying drawings in which like numerals refer to like items.

DETAILED DESCRIPTION

Figure 1:
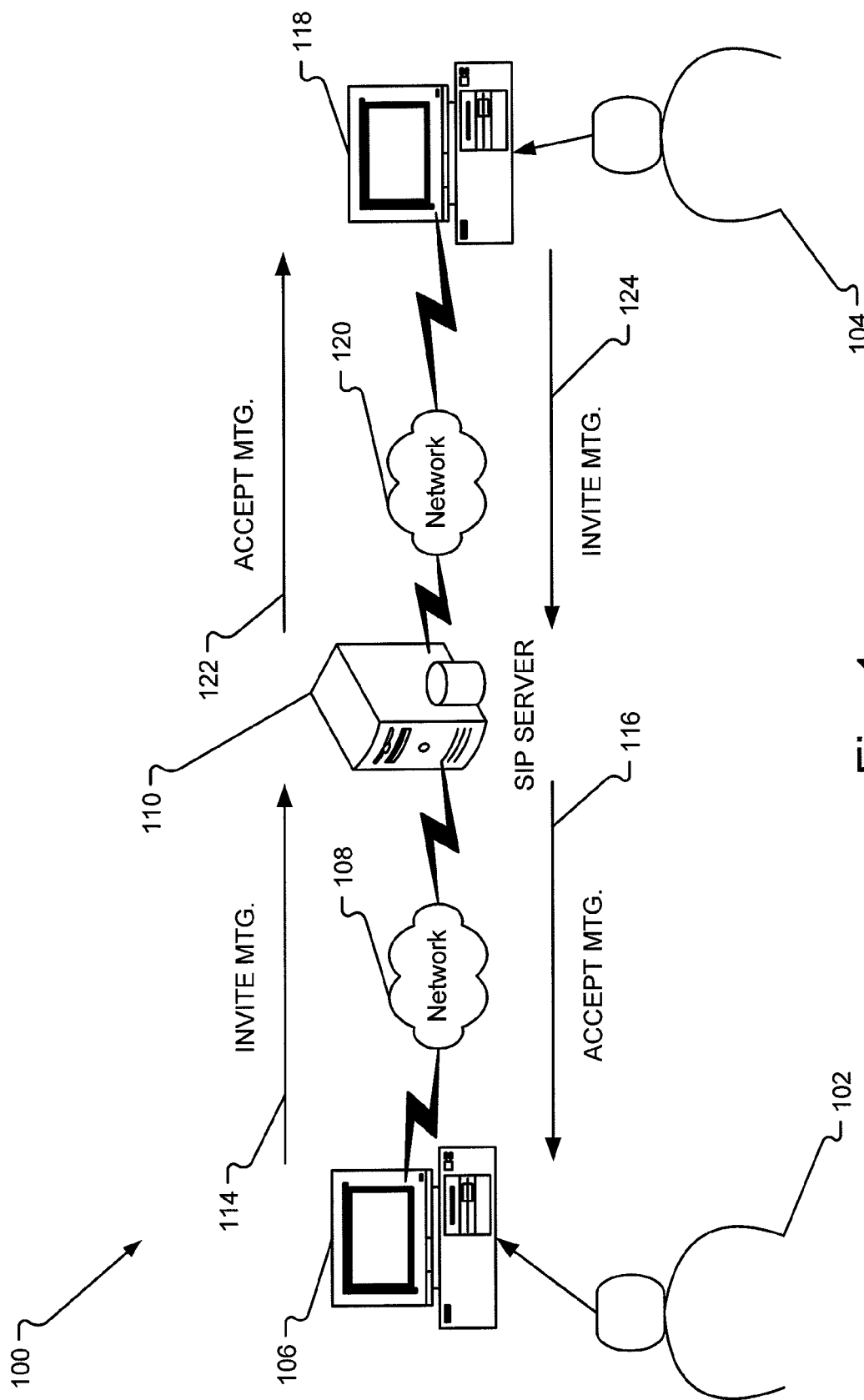
FIG. 1 illustrates an example logical representation of an environment or system for initiating a meeting between Web-based client participants in accordance with embodiments disclosed herein.

This disclosure will now more fully describe example embodiments with reference to the accompanying drawings, in which specific embodiments are shown. Other aspects may, however, be embodied in many different forms, and the inclusion of specific embodiments in this disclosure should not be construed as limiting such aspects to the embodiments set forth herein. Rather, the embodiments depicted in the drawings are included to provide a disclosure that is thorough and complete and which fully conveys the intended scope to those skilled in the art. Dashed lines may be used to show optional components or operations.

Embodiments generally relate to using a relay server to extend the functionality of a browser-based, or Web-based, client in a Web meeting environment. In alternative embodiments, the client is not a browser-based, or Web-based, client but, instead, is any type of client understood by those of ordinary skill in the art. The relay server provides tunneling of arbitrary binary data between, for example, the Web-based client, or HTTP endpoint, and an arbitrary destination, or remote server. Such tunneling is useful because the Web-based client typically communicates using the HTTP protocol and is not able to communicate using the transport protocols understood by the remote server. Such transport protocols, for example, include TCP, UDP, SRTP, TLS, etc. These protocols are offered by way of example only. Any number of transport protocols as understood by one of ordinary skill in the art may be used by the remote server. The tunneling of any arbitrary protocol, such as SIP and RDP, through HTTP is thus provided through the use of the relay server. The relay server acts as a type of "middle man" to receive a byte buffer via an HTTP request and to relay the request to a destination. Similarly, the relay server accepts data from the destination and relays the data back to the client via an HTTP response.

In an embodiment, the relay server is designed as a Web application sitting at an Internet Information Server (IIS) server, for example. The relay server in such embodiments comprises a session management component, a relay engine component, and an optional platform services component. Any number of types of components may be used in embodiments, either in combination or alone, and some components, as indicated, may be optional in embodiments as well. The relay server is designed to be extensible to enable any transport mechanism to be used to accept tunneled data from the HTTP endpoint. The relay server allows any binary data to be tunneled. For example, SIP and RDP traffic are tunneled in embodiments. However, other embodiments provide for the tunneling of any data, including file transfer data. In establishing a relay session, embodiments provide for the relay server to communicate with the destination endpoint to set up a connection so that the particular protocol data understood by the destination endpoint can be exchanged. The relay server is thus configured to communicate in an arbitrary protocol to set up the connection.

According to an embodiment for establishing a relay session, a client requests to create a session at the relay server's session management component. This interaction between the client and the relay server may be referred to as a first "leg" of the relay session. In embodiments, the relay server is configured with an optional platform service to help with the session establishment, be it authentication or DNS lookup, for example. The relay server is also configured with one or more transport modules, in which the transport module(s) communicates with a remote server in a particular protocol. The session management component drives the transport module to connect to the remote server, with potential help from the client via, for example, Web service calls. "Web service calls" are offered by way of example only of ways of communicating such information. Other types of communication understood by those of ordinary skill in the art may also be used. In an embodiment, for the first leg of the relay session, the session management component interacts with the relay engine component, generates a session identifier (session ID) to group HTTP side traffic, and returns the session ID to the client. With the session ID, a virtual connection between the client and the relay server is established over HTTP. This session ID will be present in each HTTP request the client sends out, according to embodiments. The session ID, along with sequence/acknowledgment numbers, the enforcement that there is at most one pending request per direction (upstream and downstream) according to an embodiment, and the retrying of sending out an HTTP request for a predefined number of times when a failure, for example, occurs, provide a method for the reliable and ordered delivery of bi-directional data between the client and the relay server over HTTP. As noted, in embodiments, this connection is one leg of the relay session, and a second leg of the relay session is from the relay server to the remote server, in which an arbitrary transport protocol is used. According to embodiments, a transport stack is loaded on the relay server to permit the tunneling of protocols.

By tunneling protocol data over HTTP, embodiments of the present disclosure significantly extend the functionality of the Web-based client because the relay server allows for the adaptation to the different and various means for connecting to each possible destination endpoint. For example, where the destination endpoint is a server, different means are used for connecting to the particular type of server, such as TLS to SIP server, RTP/SRTP to a Screen Sharing Server, etc.

Further, embodiments of the present disclosure also compensate for limitations caused by restrictive ports and enterprise firewalls used for enhancing security features. Due to restrictive ports present in corporate networks, it can be difficult, if not impossible, to retrieve a policy file from a Web-based client. For example, the port 943 holds the policy file implementation in the SILVERLIGHT platform. A SILVERLIGHT client computer sends requests to Web sites to access the policy file on port 943. However, the port 943 is normally not opened in corporate networks. Policy file retrieval is therefore hampered, if not made impossible altogether. Without a policy file, the browser-based client rejects opening a socket connection to a remote server. Communications between the Web-based client and the remote server are therefore not typically possible. Embodiments of the present disclosure, however, use the relay server to connect the Web-based client and remote server. The ability of the relay server to communicate in HTTP with the client allows for the traversal of corporate firewalls to be made. For example, using HTTP as a transport mechanism reduces problems in traversing corporate firewalls because ports 80/443 (HTTP 80/TCP, World Wide Web HTTP; HTTPS 443/TCP, HTTP protocol over TLS/SSL) are typically opened in the corporate network.

In embodiments, the Web-based client is therefore able to open an HTTP connection to the relay server which acts a relay for communications between the client and the remote server. The Web-based client then communicates with the relay server using HTTP requests. Upon receiving the HTTP requests, the relay server "unwraps" the actual data for exchange and forwards it to the remote host using a transport protocol understood by the remote server. Similarly, upon receiving data in the transport protocol used by the remote server, the relay server "wraps" the data in the HTTP protocol and sends, or transfers, it as part of an HTTP response to the Web-based client.

Because HTTP is a simple request/response protocol and supports multiple connections from a client to a server, ordered delivery of messages is not guaranteed. Further, the simple request/response nature of the HTTP protocols provide no built-in mechanism for ensuring the reliable delivery of messages and, thus, responses may be dropped before reaching the client. Further, these protocols provide no way to group requests to form a session. Not being able to guarantee the reliable and ordered delivery of messages is a detriment to a successful Web conference. As such, embodiments of the present disclosure provide for using a session identifier (session ID), such as a GUID-like session identifier or other cryptographically strong identifier, to group requests that belong to the same relay session, as discussed above. The session identifier is generated randomly at the relay server using a cryptographic random number generator. By using a cryptographic random number generator, a third party is prevented from guessing the number and attacking the services provided by the system. For further security, the session identifier may also be signed using a secret known only to the relay server to prevent any guessing attacks. Session identifier capabilities thus enhance security and organize the multiple connections inherent in an HTTP environment into specific relay sessions.

To further achieve the ordered delivery of messages, embodiments of the present disclosure track upstream and downstream requests so as to allow only one pending upstream request and one pending downstream request at one time. Sequence numbers and acknowledgment numbers are assigned to request and response messages to track data exchange and detect for lost messages. Upon detecting a lost message or receiving indication of a negative/failed HTTP response (such as a response with a status code of anything other than 200 OK), the HTTP request corresponding to the negative/failed HTTP response is resent and/or re-tried a predetermined number of times before ending the session. Such tracking of messages works to achieve lossless data transmission and system resiliency.

In a further embodiment to extend the functionality of a Web-based client in a constrained environment for communicating with a destination, an optional platform services component helps provide functionalities not available in the constrained environment. When different protocol data is relayed, it is likely different platform services are needed. Such services are pluggable to the system. As an example, while tunneling SIP data, platform services include an authentication broker to help a client respond successfully to security challenges initiated from a SIP server. The inability of a Web-based client to respond successfully to such challenge stems from a lack of sufficient software packages for security in the constrained client environment. The Web-based client extends its limited functionality in embodiments of the present disclosure by delegating authentication capabilities to the authentication broker, which is part of the platform services for tunneling SIP data, though its usage is not restricted to tunneling SIP data. The relay server, in embodiments, has more functionalities than the constrained client environment because it is a fully functional server. For example, the relay server in embodiments has more software packages installed. In embodiments when the relay server alone cannot provide the required functionality, the relay server platform services can go to other server components to coordinate a satisfactory result to the client. In an embodiment, for example, an authentication broker module on the relay server is leveraged to assist the client in computing an authentication handshake with the destination. The Web-based client therefore delegates cryptographic calls to the relay server and uses the relay server as a tool to handle the cryptographic calls and addresses needed for protocol communications at the remote server. Other embodiments extend the functionality of the Web-based client by delegating to the platform services component of the relay server the handling of hash computations (by implementing the necessary algorithm on the relay server) or domain name resolution API calls (for resolving host names to IP addresses), for example. The operations provided herein are offered by way of example only.

An example logical environment or system 100 for holding a Web conference between multiple participants is shown in FIG. 1. Participants 102 and 104 desire to have a Web conference with each other. As such, clients 106 and 118 contact server 110, such as a SIP server, for example, across networks 108 and 120, respectively, to request to join a meeting 114 and 124, respectively. If the session initiation requests are understood and enabled, SIP server 110 sends acceptance messages 116 and 122, respectively, to clients 106 and 118. However, where no connection is made between client 106 and SIP server 110, for example, the session request 114 may be open-ended or rejected altogether (not shown). Such a scenario may exist, for example, where the constrained environment of a client, such as a Web-based client, 106 prevents a socket connection (not shown) from being opened with server 110. Further yet, client 106 may be able to only communicate in HTTP and is therefore not able to communicate in the protocols understood by server 110, such as through TLS or TCP. It is therefore desirable to tunnel SIP, for example, over HTTP where client 106 is a Web-based client communicating only in HTTP or having some other form of restricted network connectivity, such as enterprise firewalled networks, networks behind proxy servers, NATs, etc.

Figure 2:
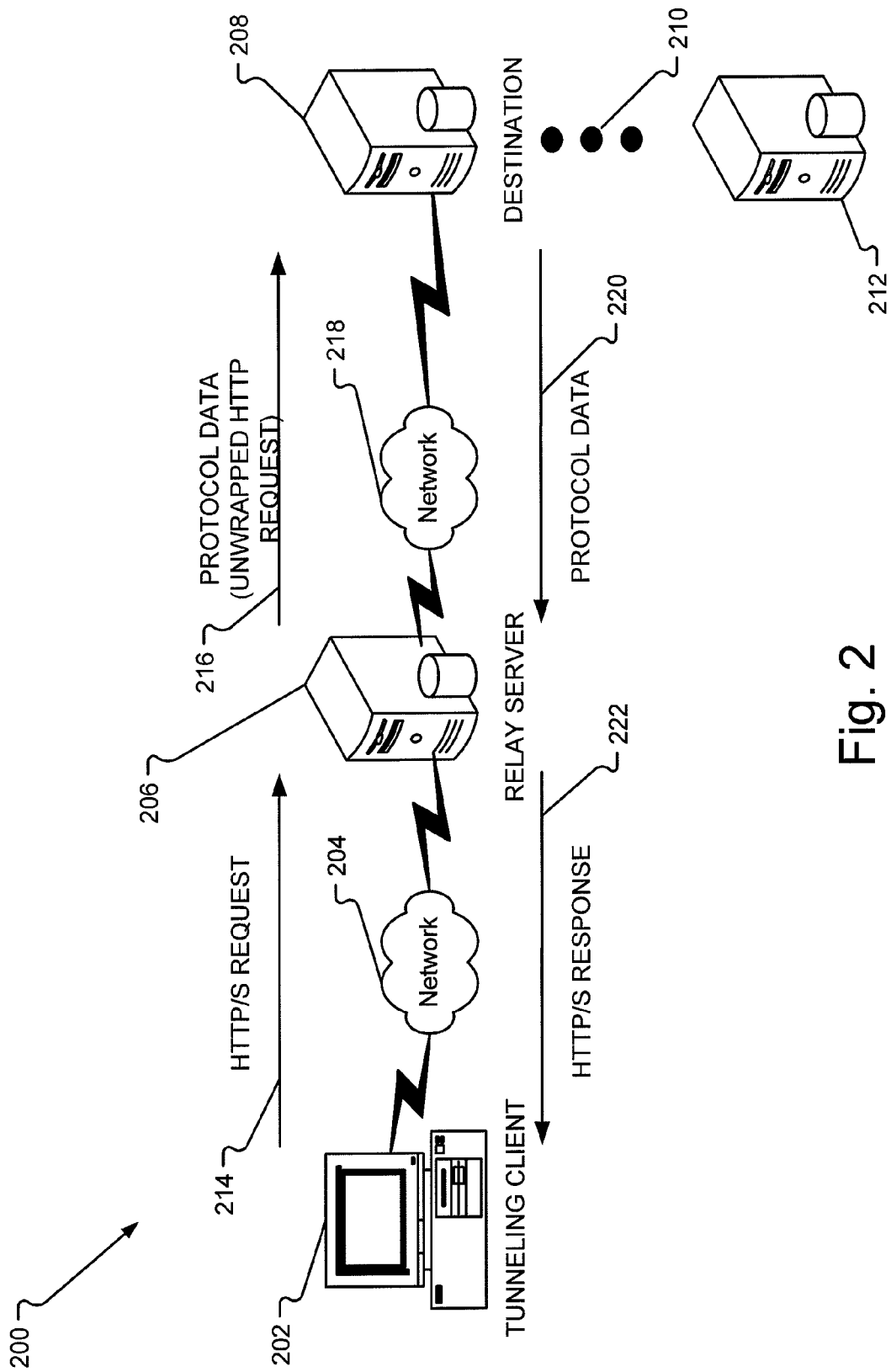
FIG. 2 depicts an example logical representation of an environment or system for tunneling arbitrary binary data through HTTP using a relay server for the meeting illustrated in FIG. 1 in accordance with embodiments of the present disclosure.

While FIG. 1 illustrates a general meeting environment, FIG. 2 depicts an example logical environment or system 200 for extending the functionality of Web-based client 202 in a restricted environment through the use of relay server 206 to enable a rich meeting experience with destination 208. Web-based client 202 is also referred to in FIG. 2 as tunneling client 202. Further, Web-based client may be referred to in embodiments as any type of arbitrary endpoint, such as a "browser-based client," etc. The term "Web-based" client is offered by way of example only. Where the communications of Web-based client 202 are HTTP-based, client 202 is not able to connect to the destination endpoint 208 if the destination endpoint 208 has existing protocols of communication that are not HTTP-based. In an embodiment, destination 208 is a remote server, such as a SIP server. In another embodiment, destination 208 is a Screen Sharing server. In still other embodiments, destination 208 is a client itself. Further yet, any number of destination endpoints 208 may be used, as shown by ellipses 210 and destination 212.

Web-based, or tunneling, client 202 sends a HTTP request 214 over network 204 to relay server 206. Relay server 206 unwraps the data in request 214 and forwards the unwrapped data 216 using a protocol understood by destination 208 over network 218 to destination 208. In embodiments, relay server 206 thus tunnels the data, e.g., SIP and RDP protocol data, through HTTP. As discussed above, any arbitrary binary data may be tunneled by relay server 206. In such an environment, relay server 206 already has an appropriate transport stack, such as RTP/SRTP or TLS, if necessary, loaded on it (not shown) to enable such tunneling.

After processing received protocol data 216, destination 208 sends protocol data 220 to relay server 206. Relay server 206 then wraps the data received from destination 208 in the HTTP protocol and sends it as part of an HTTP response 222 to client 202. Any type of arbitrary data may be tunneled in accordance with embodiments disclosed herein. For example, the environment or system 200 may allow: tunneling any data over HTTP onto RTP/SRTP; tunneling RDP over HTTP onto RTP/SRTP; tunneling RDP over HTTP onto any transport mechanism (such as TCP or UDP); and tunneling SIP over HTTP, according to embodiments.

Logical environment 200 is not limited to any particular implementation and instead embodies any computing environment upon which the functionality of the environment described herein may be practiced. For example, any type of client computer 202 understood by those of ordinary skill in the art may be used in accordance with embodiments. Further, networks 204 and 218, although shown as individual single networks may be any types of networks conventionally understood by those of ordinary skill in the art. In accordance with an embodiment, the network may be the global network (e.g., the Internet or World Wide Web, i.e., "Web" for short). It may also be a local area network, e.g., intranet, or a wide area network. In accordance with embodiments, communications over networks 204 and 218 occur according to one or more standard packet-based formats, e.g., H.323, IP, Ethernet, and/or ATM.

Further, any conceivable environment or system as understood by those of ordinary skill in the art may be used in accordance with embodiments of the present disclosure. FIG. 2 is offered as an example only for purposes of understanding the teachings of the embodiments disclosed herein. For example, FIG. 2 shows relay server 206 and destinations 208, 210, and 212. However, embodiments also cover any type of server, separate servers, server farm, or other message server. Further yet, FIG. 2 shows client computer 202. However, any type of small computer device may be used as is understood by those of ordinary skill in the art without departing from the spirit and scope of the embodiments disclosed herein. Although only one client computer 202 is shown, for example, another embodiment provides for multiple small computer devices to communicate with relay server 206. In an embodiment, each small computer device communicates with the network 204, or, in other embodiments, multiple and separate networks communicate with the small computer devices. In yet another embodiment, each small computer device communicates with a separate network. Indeed, environment or system 200 represents a valid way of practicing embodiments disclosed herein but is in no way intended to limit the scope of the present disclosure. Further, the example network environment 200 may be considered in terms of the specific components described, e.g., relay server, client computer, etc., or, alternatively, may be considered in terms of the analogous modules corresponding to such units.

Figure 3:
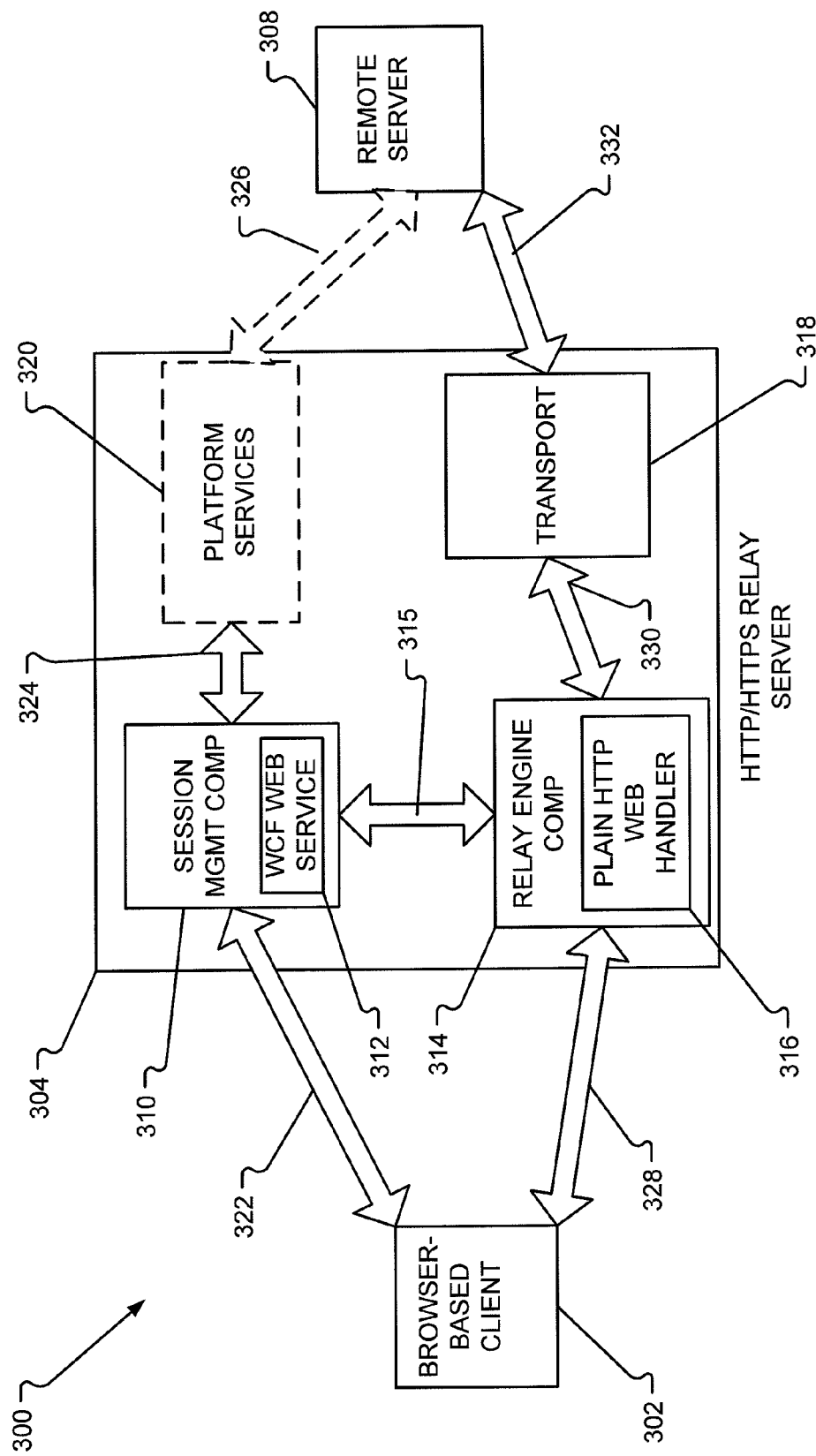
FIG. 3 illustrates a logical representation of example functional component modules for protocol tunneling over HTTP using the relay server depicted in FIG. 2 in accordance with embodiments of the present disclosure.

While FIG. 2 shows example environment or system 200 for protocol tunneling over HTTP, FIG. 3 illustrates software functional modules 300 for extending the functionality of browser-based client 302 through relay server 304 according to embodiments of the present disclosure. Software functional modules 300 are executed in the computing system shown in FIG. 3 in accordance with embodiments disclosed herein. In the embodiment shown in FIG. 3, browser-based client 302 contacts, such as via a Web service call 322, relay server 304 to create a relay session. Session management component 310, comprising Web service 312, of relay server 304 interacts, via method calls 315, for example, with relay engine 314 comprising plain HTTP Web handler 316 to configure the requested relay session. In embodiments, session management component 310 provides functionality for initiating, and setting up, connections between client 302 and a destination, such as remote server 308, by generating session identifiers, etc., for establishing connections between the entities involved in the meeting, for example, and for grouping requests that belong to the same relay session. According to an embodiment, the session identifier(s) is returned to the client via a Web service call return value, for example. Once a session is established, relay engine component 314 provides for exchanging data between client 302 and remote server 308. Relay engine 314 also provides in embodiments for assigning sequence numbers and acknowledgement numbers to ensure the reliable and ordered delivery of request and response messages.

In an embodiment, session management component 310 first contacts 324 platform services component 320, or authentication component 320, to access permission for configuring the relay session. (In some embodiments, platform services component 320 is optional, as shown by dashed lines 320.) According to embodiments, platform services component 320 provides for performing authentication of client 302, as well as for handling cryptographic call operations and DNS resolution operations, for example. These services are offered by way of example only. Other and additional types of services are performed by platform services component 320. In some embodiments, platform services component 320 may be invoked directly by browser-based client 302. According to an embodiment, browser-based client 302 may need to be authenticated to join a meeting with remote server, or destination, 308. In a further embodiment, authentication component 320 has the information or data, such as challenge data, to pass to browser-based client 302 for authentication before creation of the relay session with relay server 304 acting as the "middle man" between browser-based client 302 and remote server 308. In yet a further embodiment, authentication component 320 contacts 326 remote server 308 to validate client 302 for joining the conference by presenting the client request to create the relay session to remote server 308 and/or by obtaining authentication information or data, e.g., challenge data, and a unique identifier in embodiments, for sending 322 to client 302 for construction of a challenge response message 322. The optional nature of the contact between authentication component 320 and remote server 308 is shown by dashed lines 326. Where remote server 308 is contacted, it may verify a secret provided by relay server 304, according to embodiments, and, where such verification is successful, provide challenge data (including a unique identifier according to embodiments) to authentication component 320 (as shown by the bi-directional nature of contact 326). In yet other embodiments, no secret is provided to remote server 308, and remote server 308 provides challenge/identifier data without any verification of the request from relay server 304.

In embodiments where authentication is required and is successful (or where no authentication is first required, as discussed above), session management component 310 interacts 315, through method calls, for example, with the relay engine component 314 to configure the relay session. Upon successfully creating a relay session, session management component 310 assigns a session ID to client 302. In an embodiment, the session ID assigned to client 302 is used to group requests that belong to the same session. In an embodiment, the session ID is a GUID-like, or other cryptographically strong, session identifier. A GUID-like identifier is offered by way of example only. Other types of session identifiers, such as those to enhance security even further, may be used according to embodiments of the present disclosure. In an embodiment, one session ID is assigned to SIP requests, while another session ID is assigned to RDP requests from browser-based client 302, for example. Such session ID is sent 322 to browser-based client 302 from relay server 304, and client 302 then uses the session ID as a HTTP header to communicate 328 with relay engine 314. Upon receiving data from browser-based client 302, relay engine 314 interacts 330 with transport component 318 to relay data 332 to and from remote server 308. Relay engine 314 thus unwraps received, or transferred, data in HTTP requests and forwards the data to remote server 308 in the proper protocol(s) for such transport. Relay server 304 thus acts as a "tunnel" for communicating in the desired network protocol(s). The software functional modules 300 are offered as an example of possible software functional modules for the embodiments described. Other embodiments may include the modules depicted, fewer than the modules and/or sub-modules depicted, additional modules and/or sub-modules, combinations of modules and/or sub-modules, expansions of the modules and/or sub-modules depicted, etc.

According to embodiments, modules corresponding to those on relay server 304 also exist on browser-based client 302 and remote server 308 to enable such communications and transport. At the client side, an embodiment comprises, for example, a corresponding module to the relay server to initiate the HTTP request, put the session ID as the HTTP header in requests, assign sequence numbers and consume acknowledgment numbers for upstream data, consume sequence numbers and generate acknowledgment numbers for downstream data, etc. At the remote server, according to embodiments, the corresponding part to the relay server is a protocol participant. In an embodiment, the protocol participant is a TCP participant, for example, to assist in moving data between the relay server and the remote server.

Figure 4:
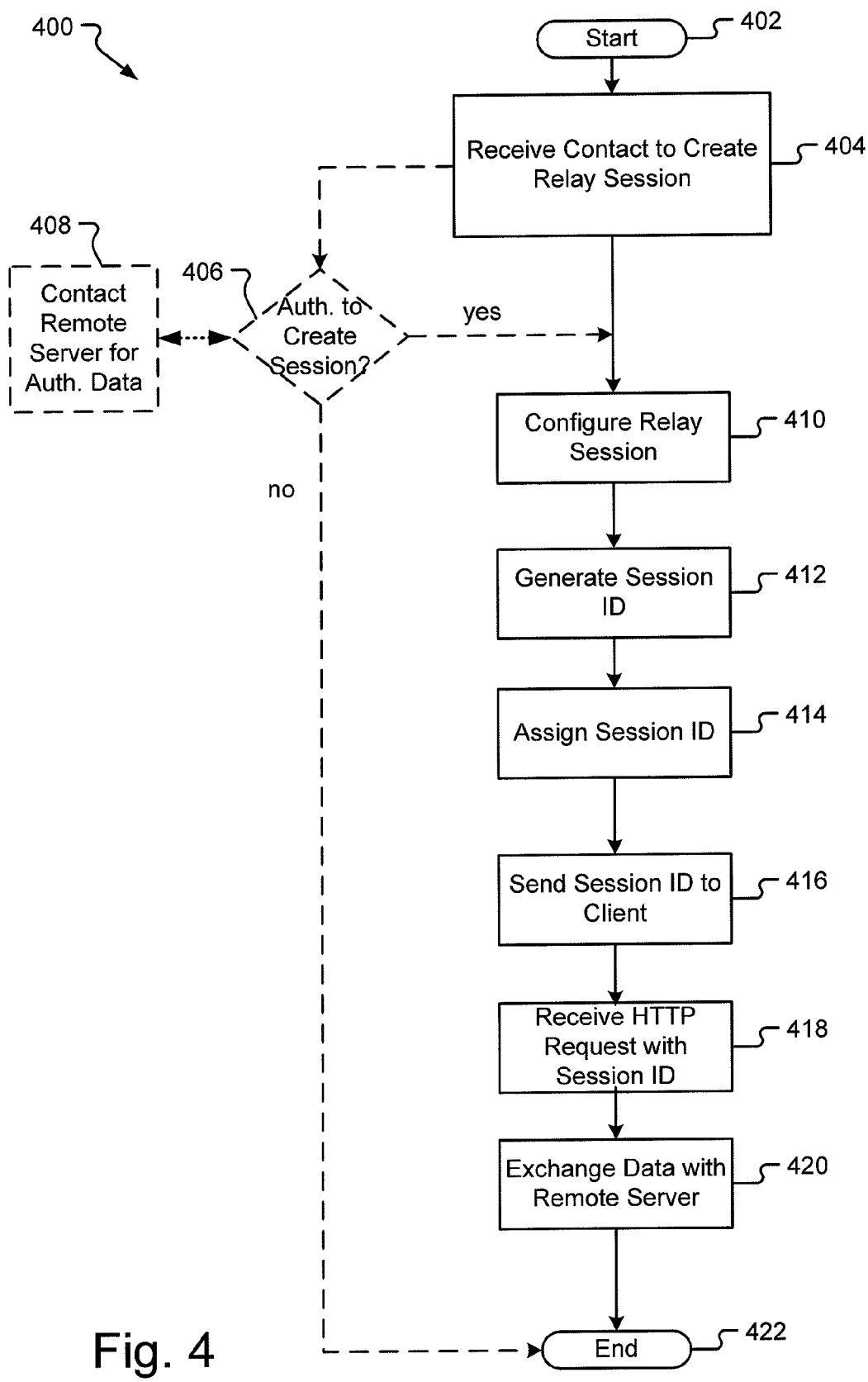
FIG. 4 illustrates a flow diagram illustrating the operational characteristics of a process depicting the interactions of the functional component modules depicted in FIG. 3 in accordance with an embodiment of the present disclosure.

The interactions of the various software functional modules depicted in FIG. 3 are further illustrated in the operational steps 400 depicted in FIG. 4 for tunneling protocol data via HTTP in accordance with an embodiment disclosed herein. Start operation 402 is initiated, and process 400 proceeds to receive contact, such as via a Web service call, for example, from browser-based client to create a relay session 404. Prior to configuring the requested relay session 410, process 400 may optionally (as shown by dashed lines) first proceed to query 406 to determine from a platform services component whether the client is permitted, e.g., authenticated and/or authorized, to create the session with the destination. In making such a determination 406, relay server, such as through platform services component 320, may optionally contact the destination 408, such as remote server 308 in FIG. 3, to obtain challenge data and/or other authentication data for completing the handshake between the client and the destination to configure the requested session. While steps 406 and 408 are both shown as optional steps according to the embodiment described, other embodiments require such authentication determination at 406 but do not require contact with the remote server 408. In still further embodiments, both steps 406 and 408 are required authentication and/or authorization steps. The authentication involved in steps 406 and 408 shows the pluggable nature of the platform services, e.g., authentication broker, used in embodiments of the present disclosure. If query 406 determines that the client is authenticated and/or authorized for setting up a relay session, process 400 proceeds YES to configure relay session 410. If the client is not authenticated and such authentication is required for proceeding according to embodiments disclosed herein, process 400 proceeds NO to END operation 422, in which process 400 is terminated. Where the client is permitted to configure the relay session and such session is configured 410, process 400 proceeds to generate and assign session ID 412 and 414, respectively, in which a session ID is generated and assigned to the client. In an embodiment, a session ID is generated and assigned to group requests that belong to the same relay session. In an embodiment, such session ID is generated randomly at the relay server, such as at the session management component, for example, with a cryptographic random number generator. As discussed, while a GUID session ID is described, this type of identifier is offered by way of example only. Any number of types of identifiers may be used as understood by those of ordinary skill in the art without departing from the spirit and scope of the present disclosure.

Next, process 400 proceeds to send session ID to client 416, in which the session ID assigned to requests belonging to the particular relay session is sent to the client. The client then uses the session ID as a HTTP header to communicate with the relay server for further exchange of data, in which the relay server receives an HTTP request with the session ID 418. Data is then exchanged with the remote server 420 through the relay server, and process 400 terminates at END operation 422. FIG. 4 is an example of possible operational characteristics for protocol tunneling over HTTP through the use of a relay server in accordance with embodiments disclosed herein. Operational steps depicted may be combined into other steps and/or rearranged. Further, fewer or additional steps may be used, for example.

Figure 5:
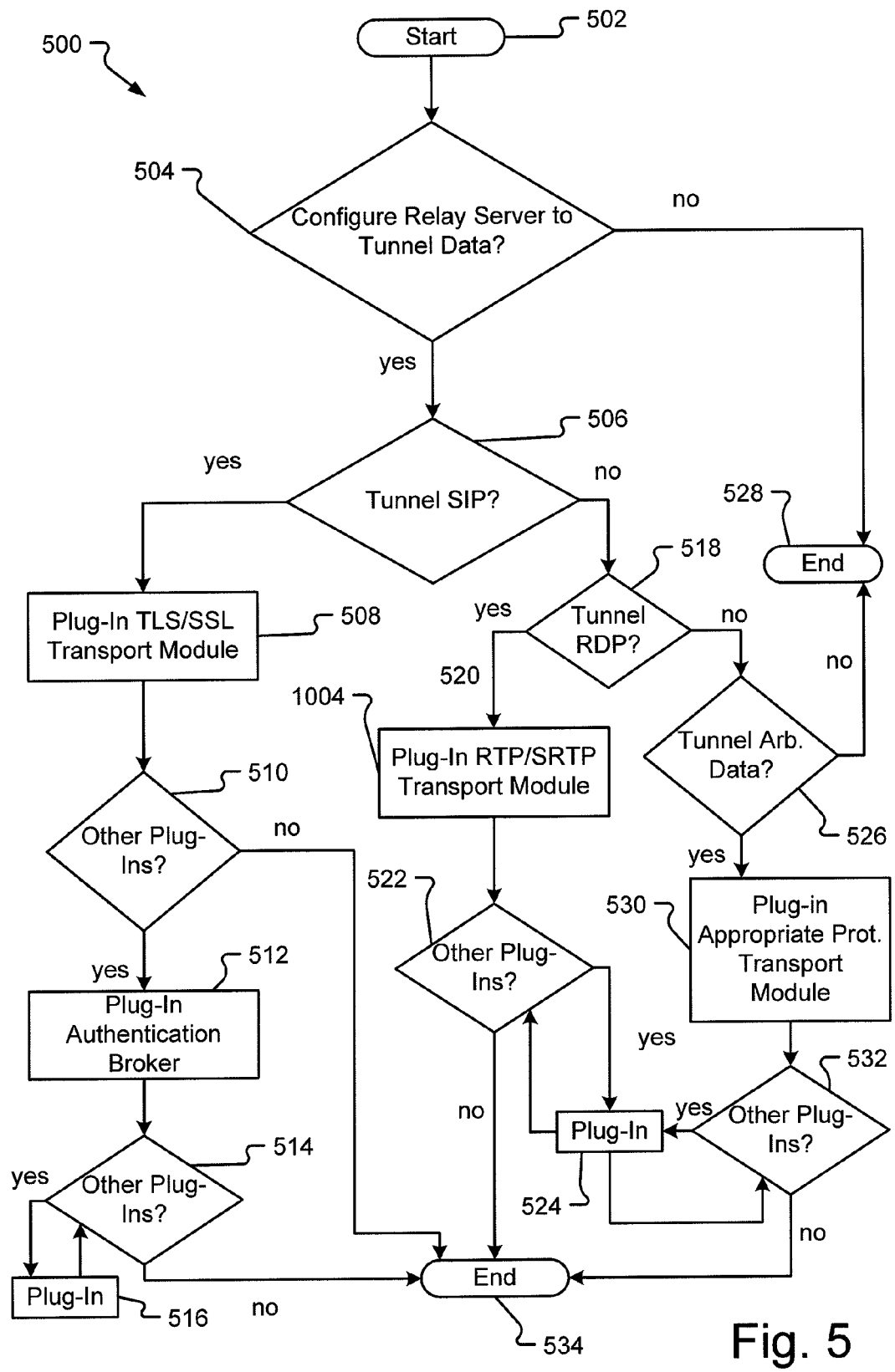
FIG. 5 depicts a flow diagram illustrating the operational characteristics of a process illustrating the pluggable nature of the system using a relay server in accordance with embodiments of the present disclosure.

FIG. 5 next illustrates the pluggable nature of the system according to embodiments of the present disclosure. For example, as discussed above, the platform services components are pluggable to provide services to a client in a restricted environment. An authentication broker, for example, as part of the platform services component according to embodiments, assists a client with SIP authentication. Further, the transport is pluggable. The pluggable nature of the transport enables the tunneling of arbitrary data because any appropriate protocol(s) for the data desired to be tunneled can be used. For example, SIP tunneling uses TLS as a transport in embodiments, while RDP tunneling uses SRTP as a transport in embodiments. FIG. 5 illustrates a process, according to an embodiment, for configuring, such as by a developer, a relay server to be pluggable in nature. Process 500 is initiated at START operation 502 and proceeds to query 504 to determine if it is desired to configure a relay server to tunnel data. If NO, process 500 proceeds to END operation 528, and process 500 terminates. If YES, process 500 proceeds YES to determine operation 506, in which it is determined whether to tunnel SIP data. If YES, process 500 proceeds to add plug-in TLS/SSL transport module 508, in which TLS/SSL is used as a transport in SIP tunneling in an embodiment. In another embodiment, another type of protocol is used for transport for SIP tunneling. Next, process 500 proceeds to query 510 for determining whether any other plug-ins are to be added. If no further plug-ins are desired, process 500 proceeds NO to END operation 534, and process 500 is terminated. If other plug-ins are desired, process 500 proceeds YES to add authentication broker plug-in 512, for example. The authentication broker, in embodiments, is a set of platform services that assist a client in performing SIP authentication. Following add plug-in authentication broker 512, process 500 proceeds to query 514 for determining whether any other plug-ins are desired. If YES, a plug-in is added 516, and steps 514-516 repeat until no other plug-ins are desired. If no other plug-ins are desired, process 500 proceeds NO to END operation 534 and terminates.

Returning to query 506, if SIP tunneling is not desired, process 500 proceeds NO to query 518 for determining whether it is desired to tunnel RDP data. If tunneling of RDP data is desired, process 500 proceeds YES to add plug-in for RTP/SRTP transport module 520, in which RDP tunneling uses RTP/SRTP as a transport. Next, it is determined whether any other plug-ins are desired to be added 522. If no other plug-ins are desired, process 500 proceeds NO to END operation 534 and process 500 terminates. If other plug-ins are desired, process 500 proceeds YES to add plug-in 524 which proceeds to query 522 to again determine whether any other plug-ins are desired, and these steps repeat. If no other plug-ins are desired, process 500 proceeds NO to terminate process 500 at END operation 534.

Returning to step 518, if tunneling of RDP is not desired, process 500 proceeds NO to query 526 for determining if tunneling of any arbitrary data is desired. If NO, process 500 terminates at END operation 528. If tunneling of arbitrary data is desired, process 500 proceeds YES to plug-in appropriate protocol transport module 530 to support arbitrary protocol data tunneling. Next, it is determined whether any other plug-ins are desired at operation 532. If other plug-ins are desired, process 500 proceeds YES to add plug-in 524 and these steps repeat until no other plug-ins are desired. When no other plug-ins are desired, process 500 proceeds NO to END operation 534 to terminate process 500. FIG. 5 is an example of possible operational characteristics for configuring, such as by a developer, a relay server to be pluggable in nature in accordance with embodiments disclosed herein. Operational steps depicted may be combined into other steps and/or rearranged. Further, fewer or additional steps may be used, for example.

Figure 6:
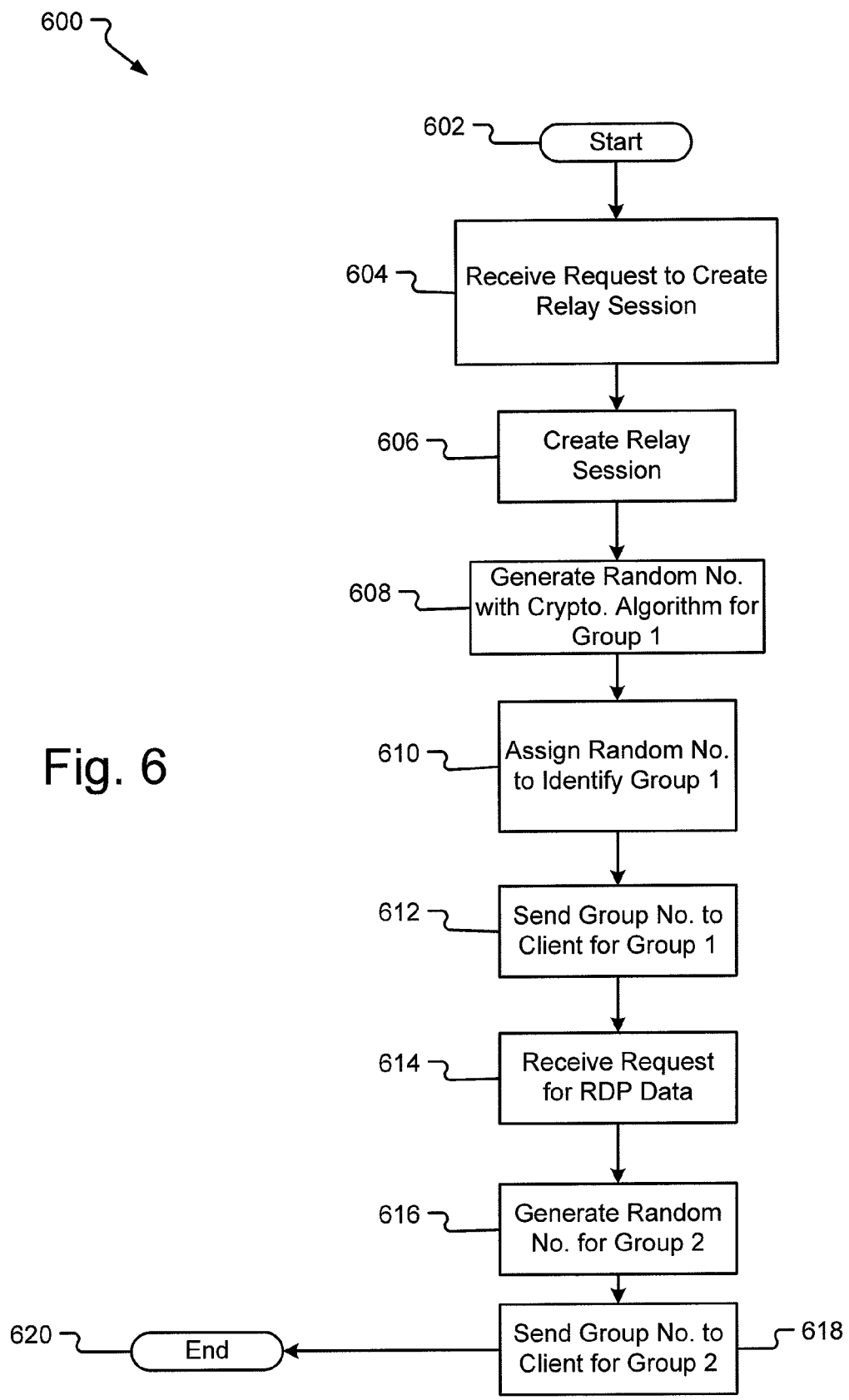
FIG. 6 illustrates a flow diagram depicting the operational characteristics of a process for grouping requests (through the use of a session identifier) that belong to the relay session in accordance with an embodiment of the present disclosure.

FIG. 6 next illustrates example operational steps 600 for assigning session IDs to group requests belonging to the same relay session in accordance with an embodiment disclosed herein. Process 600 is initiated at START operation 602 and proceeds to receive request to create relay session 604, in which a request, such as a SIP request, from a browser-based client is received at a relay server. A relay session is created at operation 606, and a session ID is generated randomly 608 with a cryptographic random number generator for assigning the request, e.g., SIP request, to a group belonging to the same relay session. In an embodiment, the session ID is a GUID-like session ID. Next, process 600 proceeds to assign random number to group 1 operation 610. The group number is sent to client 612 for "Group 1," for example. Next, process 600 proceeds to receive a request for RDP data, for example, from browser-based Web application 614. Another session ID is next generated 616 to group requests for the RDP data, for example, into a "Group 2," for example. The session ID for assigning a group number to the client for the "Group 2" is sent to client 618, and process 600 terminates at END operation 620. FIG. 6 is an example of possible operational characteristics for assigning a session ID to group requests belonging to the same relay session in accordance with embodiments disclosed herein. Operational steps depicted may be combined into other steps and/or rearranged. Further, fewer or additional steps may be used, for example.

Figure 7:
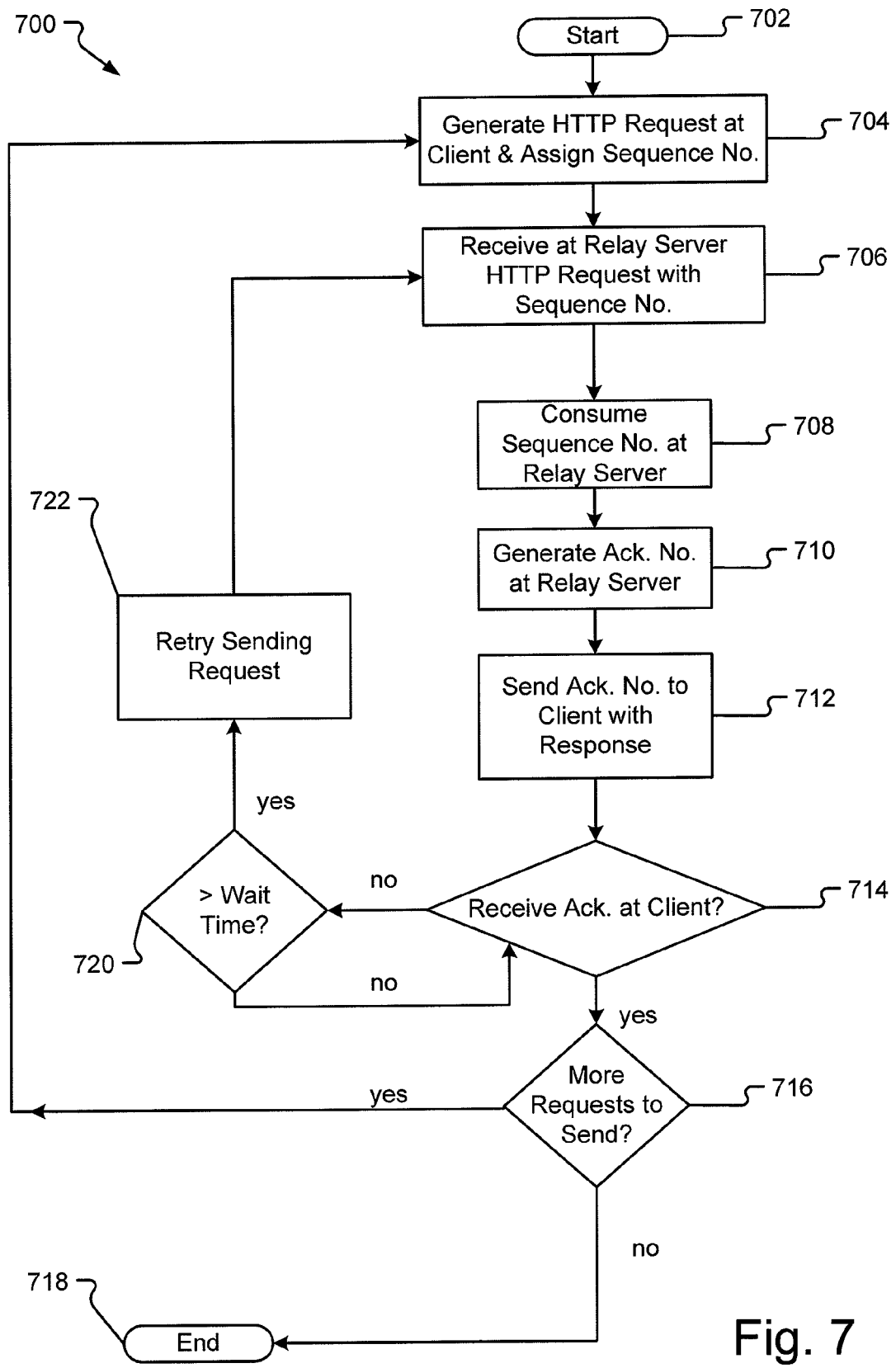
FIG. 7 depicts a flow diagram illustrating the operational characteristics of a process for assigning sequence and acknowledgment numbers to requests and responses to ensure the reliable and ordered delivery of messages in accordance with an embodiment of the present disclosure.

Further, FIG. 7 depicts example operational steps 700 for performing a method for assigning sequence numbers and acknowledgment numbers to ensure the reliable and ordered delivery of data between a client, such as a Web browser-based client, and a relay server, in accordance with embodiments disclosed herein. Process 700 is initiated at START operation 702 and proceeds to generate HTTP request at a browser-based client 704, in which process 700 illustrates upstream data moving from a browser-based client to a remote server via a relay server. At operation 704, a sequence number is also assigned to the request by the client. Next, the HTTP request with the sequence number is received 706 at the relay server. The relay server consumes the sequence number 708, in which the sequence number is passed to the relay server as a HTTP header. The relay server next generates an acknowledgment number 710. The relay server passes the acknowledgment number with the HTTP response back to the client 712 as a HTTP header to a HTTP response and/or as the body of the response according to embodiments. At the client side, the HTTP response (if received) is matched to the pending request (not shown). Matching the HTTP response to its request is performed at the client by the underlying platform, such as the Web browser according to an embodiment. In such an embodiment, an HTTP response is received at the client via the same connection, such as TCP, that the request was sent on. This matching and tracking of the request/response sequence and acknowledgment numbers allows, in embodiments, for assisting with ordered and reliable data transmission over HTTP.

Because response messages and acknowledgment numbers may be dropped during transmission from the relay server to the client, process 700 provides for determining at query 714 whether the client has received an acknowledgment corresponding to the data sent in the HTTP request. For upstream data, for example, each HTTP request initiated from the client carries a sequence number for the first byte of data that the particular request carries, according to an embodiment disclosed herein. In addition, each request has a length number indicating the number of bytes of data the request carries. At the relay server side, the acknowledgment number generated for the response message is the last byte the relay server has received. All data with sequence numbers prior to this acknowledgment number are therefore also confirmed with the most recent acknowledgment number. Once the client confirms that the bytes have been received, it will remove the bytes from its cache. Otherwise, where no confirmation is received, the data is re-delivered according to embodiments. For example, where the sequence number starts at 1 and the length of the request comprises 100 bytes, the acknowledgment number the client looks for is 100. Where a second request is sent, the sequence number starts at 101, and if the length is 200, the client looks for a corresponding acknowledgment number of 300.

Returning to FIG. 7, if an acknowledgment is received at 714 (indicating the reliable delivery of the request/response messages), process 700 proceeds YES to query 716 for determining whether the client desires to send any other requests to the remote server via the relay server. If other requests are desired, process 700 proceeds YES to generate HTTP request and assign sequence number 704 to the next request. If no other requests are desired, process 700 proceeds NO to END operation 718, and process 700 terminates.

When query 714 determines that no acknowledgment has been received, or, in other embodiments, that a response indicating negative treatment and/or failed treatment has been received, process 700 proceeds NO to query 720 to determine whether a predetermined wait time has been exceeded. If the wait time, such as indicated by a timer in embodiments, for the acknowledgment has not yet been exceeded, process 700 proceeds back to query 714 to determine if the acknowledgment has been received yet, and steps 714 and 720 repeat. If the predetermined wait time has been exceeded, process 700 proceeds YES to operation 722 to retry sending the request, and process 700 then proceeds again to operation 706. After repeating steps 706 to 716, process 700 eventually proceeds to END operation 718, and process 700 terminates. FIG. 7 is an example of possible operational characteristics for assigning sequence numbers and tracking acknowledgments of requests to ensure ordered and reliable delivery of messages in accordance with embodiments disclosed herein. Operational steps depicted may be combined into other steps and/or rearranged. Further, fewer or additional steps may be used, for example.

By using acknowledgment queries and/or acknowledgment numbers and waiting to send the second request until the first request is acknowledged as received, process 700 provides for the reliable and ordered delivery of messages by tracking messages to prevent lost data and achieve lossless data transmission with system resiliency. Further, tracking the request/response messages allows for the system to maintain ordered delivery by having only one pending upstream request and one downstream request at a time, in which a second request may not be sent until the first request/response is acknowledged, according to embodiments disclosed herein. Further, the use of acknowledgment numbers allows the system to track requests that are retried for sending with new data in addition to the data carrying the request. In addition, as discussed, the ordered delivery of messages is beneficial in an HTTP request/response conferencing environment given that HTTP allows for multiple connections at one time, for example. While FIG. 7 illustrates the steps for achieving reliable and ordered data delivery between the client and relay server, and vice versa, the reliable and ordered delivery of data between the relay server and a remote server is dictated by the protocol used between them, according to embodiments disclosed herein.

While FIG. 7 shows sequence/acknowledgment numbers for upstream data, i.e., client to remote server via relay server, corresponding steps are involved for downstream data, i.e., remote server to client via relay server, according to embodiments disclosed herein. In an embodiment, a sequence number is generated at the relay server side and is consumed by the client. The client then generates an acknowledgment number, which is consumed at the relay server, according to embodiments.

Figure 8A:
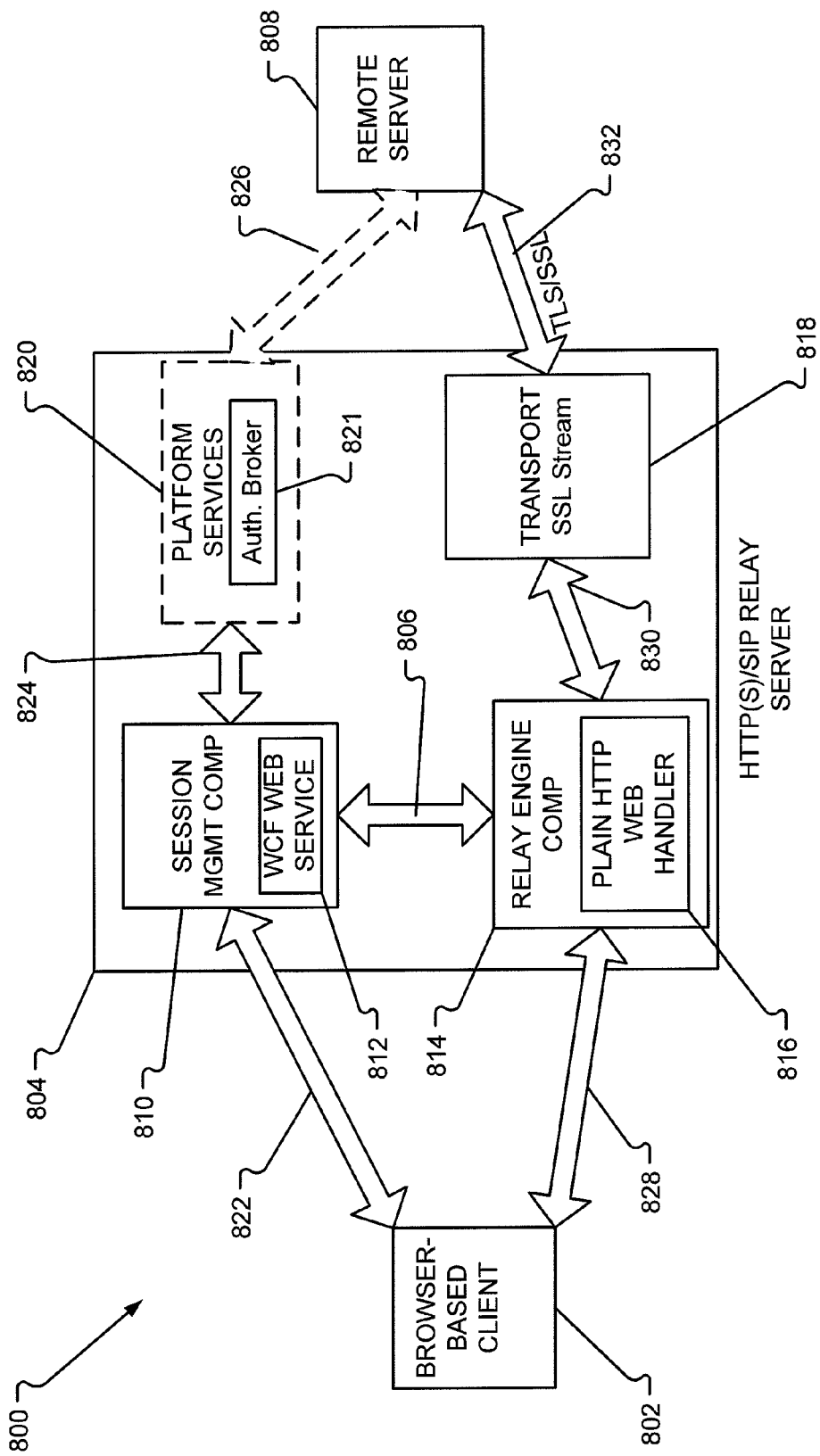
FIG. 8A illustrates a logical representation of example functional component modules of the relay server for tunneling SIP data in accordance with embodiments of the present disclosure.

While FIG. 3 above illustrates example software functional modules 300 for extending the functionality of browser-based client 302 through relay server 304, FIG. 8A depicts example software functional modules 800 for tunneling SIP data and for using optional platform services plugged into the system to assist in tunneling SIP data, such as by performing authentication, in accordance with embodiments disclosed herein. Browser-based client 802 contacts, for example via a Web service call 822, to relay server 804 to configure a relay session. Session management component 810 of relay server 804 comprising Web service 812 interacts, via method calls 806, for example, with relay engine 814 comprising a plain HTTP Web handler 816 to configure the requested relay session. In embodiments, session management component 810 provides functionality for initiating, and setting up, a SIP session with connections between client 802 and a destination, such as remote server 808 by generating session identifiers, etc., for establishing connections between the entities involved in the meeting, for example, and for grouping requests that belong to the same relay session. According to an embodiment, the session identifier(s) is returned to the client via a Web service call return value 822, for example. Once a session is established, relay engine component 814 provides for exchanging data between client 802 and remote server 808. Relay engine 814 also provides in embodiments for assigning sequence numbers and acknowledgement numbers to ensure the reliable and ordered delivery of request and response messages.

In an embodiment, an optional (as shown by dashed lines 820) platform services component 820 is first contacted 824 to access permission for configuring the desired relay session. According to embodiments, platform services component 820 provides for performing authentication of client 802, as well as for handling cryptographic call operations and DNS resolution operations, for example. In a further embodiment, authentication broker 821 is used as a set of pluggable platform services that assist a client in performing SIP authentication. Authentication broker, in such an embodiment, has the information or data, such as challenge data, to pass to browser-based client 802 for authentication before creation of the relay session with relay server 804 acting as the "middle man" between browser-based client 802 and remote server 808. In yet a further embodiment, authentication component contacts 826 remote server 808 to validate client 802 for joining the conference, for example, by presenting the client request to create the relay session to remote server 808 and/or by obtaining authentication information or data, e.g., challenge data, and a unique identifier in embodiments, for sending 822 to client 802 for construction of a challenge response message 822. The optional nature of the contact 826 between authentication component 820 and remote server 808 is shown by dashed lines 826. Where remote server 808 is contacted, it may verify a secret provided by relay server 804 according to embodiments, and, where such verification is successful, provide challenge data (including a unique identifier according to embodiments) to authentication component 820 (as shown by the bi-directional nature of contact 826). In yet other embodiments, no secret is provided to remote server 808, and remote server 808 provides challenge/identifier data without any verification of the request from relay server 804.

In embodiments where authentication is performed and is successful (or where no authentication is first performed, as discussed above), session management component 810 interacts, through method calls 806, for example, with the relay engine component 814 to configure the relay session. Upon successfully creating a relay session, session management component 810 assigns a session ID to client 802. In an embodiment, the session ID assigned to client 802 is used to group SIP requests belonging to the same session. Such session ID is sent 822 to browser-based client from relay server 804, and client 802 then uses the session ID as a HTTP header to communicate 828 with relay engine 814. Upon receiving data from browser-based client 802, relay engine 814 interacts 830 with the SSL Stream transport module 818 to relay data 832 to and from remote server 808 using TLS/SSL 832, for example. Relay engine 814 thus unwraps received, or transferred, data in HTTP requests and forwards the data to remote server 808 in the TLS/SSL protocols for transport. Relay server 804 thus acts as a "tunnel" for communicating in SIP. The example software functional modules 800 are offered as an example of possible software functional modules for the embodiments described. Other embodiments may include the modules depicted, fewer than the modules and/or sub-modules depicted, additional modules and/or sub-modules, combinations of modules and/or sub-modules, expansions of the modules and/or sub-modules depicted, etc.

Figure 8B:
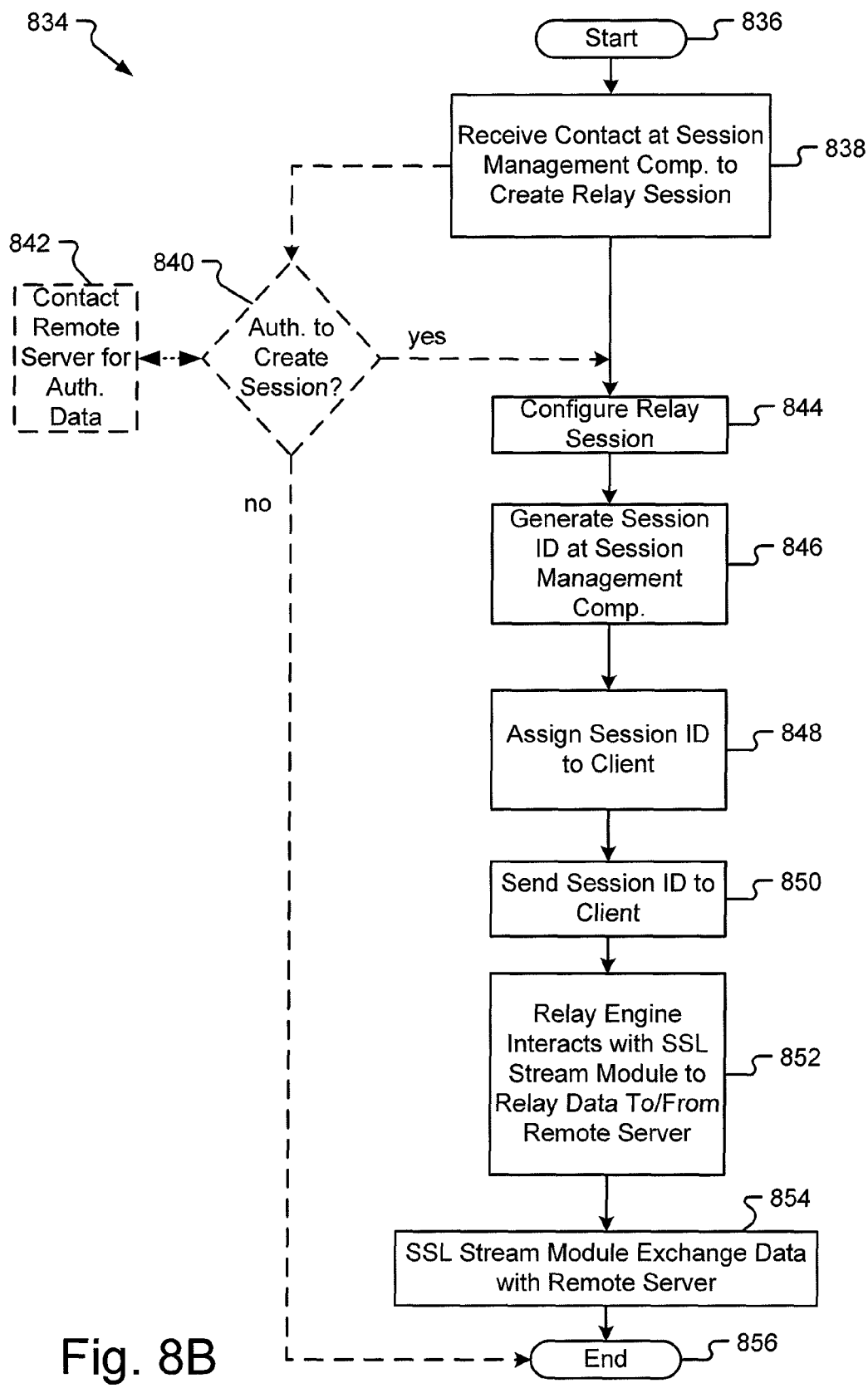
FIG. 8B illustrates a flow diagram illustrating the operational characteristics of a process depicting the interactions of the functional component modules depicted in FIG. 8A in accordance with an embodiment of the present disclosure.

Continuing to FIG. 8B, example operational steps 834 are shown for tunneling SIP data using a SSL Stream transport module and a pluggable authentication module as depicted in FIG. 8A and in accordance with embodiments disclosed herein. Process 834 is initiated at START operation 836 and proceeds to receive contact, such as via a Web Service call, for example, at the session management component of the relay server to create a relay session 838. The session management component next interacts with a relay engine to configure the requested relay session 844. However, process 834 may first optionally proceed to query 840 to determine from a platform services component whether the client is permitted, e.g., authenticated and/or authorized, to create the session. In making this determination 840, relay server, such as through platform services component 820 and/or authentication broker 821 may optionally contact 842 remote server 808 to obtain challenge data and/or authentication data for completing the handshake between client 802 and remote server 808 (as shown by the optional bi-directional nature of the arrow between steps 840 and 842). In other embodiments, authentication broker 821 provides challenge data and/or authentication data for the handshake completion. If client 802 is not authenticated and/or authorized to create the relay session, process 834 proceeds NO to END operation 856, and process 834 terminates. If authentication and/or authorization is desired and successful, process 834 proceeds YES to configure relay session operation 844, in which the relay session is configured 844. A session ID is generated 846 and assigned 848 to the client at the session management component and sent to the client 850. The relay engine then interacts with the transport module for the SIP tunneling, e.g., a SSL Stream Module to relay data to and from the remote server 852. The SSL Stream transport module then communicates with the remote server to exchange data 854, and process 834 terminates at END operation 856. FIG. 8B is an example of possible operational characteristics for tunneling SIP over HTTP using a relay server between a client and a remote server in accordance with embodiments disclosed herein. Operational steps depicted may be combined into other steps and/or rearranged. Further, fewer or additional steps may be used, for example.

Figure 9:
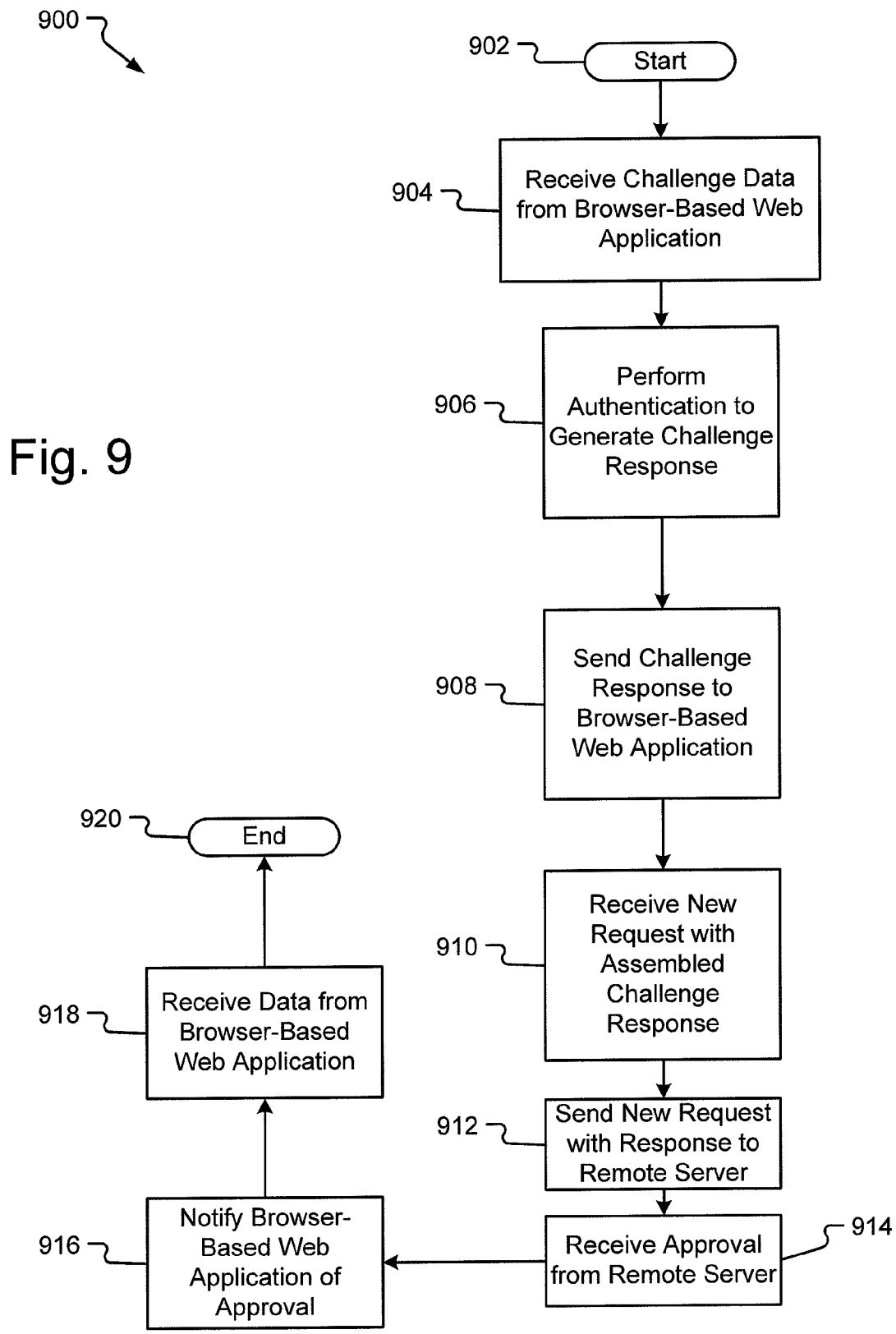
FIG. 9 illustrates a flow diagram depicting the operational characteristics of a process for authenticating an HTTP endpoint with an arbitrary destination through the use of an authentication broker on the relay server in accordance with an embodiment of the present disclosure.

Next, FIG. 9 illustrates example operational steps 900 showing how optional platform services are plugged into the overall system to assist in tunneling a particular protocol, e.g., SIP, data. For example, FIG. 9 shows the use of a pluggable authentication module for assisting a client, e.g., an HTTP endpoint, in completing an authentication handshake with a destination, e.g., a remote server in accordance with embodiments disclosed herein. Process 900 thus shows the delegation of authentication to a relay server by a browser-based client. Process 900 is initiated at START operation 902 and proceeds to receive challenge data from browser-based Web application 904. The relay server then performs authentication 906, using the challenge data received from the browser-based client, to generate a challenge response for sending the challenge response to client 908. In an embodiment, the relay server contacts the remote server in performing authentication 906 and, in another embodiment, the relay server performs the authentication itself for generating the challenge response for the browser-based client. Upon receiving the challenge response, the browser-based application assembles the returned challenge response into a new request message, such as a new SIP message for initiating a session with the relay server and remote server. The relay server then receives the new request with the assembled challenge response 910 and sends the new request to the remote server 912 for initiating the session, for example. Upon determining that the client is a valid participant (not shown), the remote server sends approval to the relay server, which is received by the relay server 914. The relay server then notifies the browser-based Web application of the approval and the initiation of the session 916. Data for exchange is then received from the browser-based Web application at the relay server 918, and process 900 terminates at END operation 920. FIG. 9 is an example of possible operational characteristics for authenticating a handshake between a browser-based Web application and a destination by delegating the authentication to the relay server in accordance with embodiments disclosed herein. Operational steps depicted may be combined into other steps and/or rearranged. Further, fewer or additional steps may be used, for example.

Figure 10:
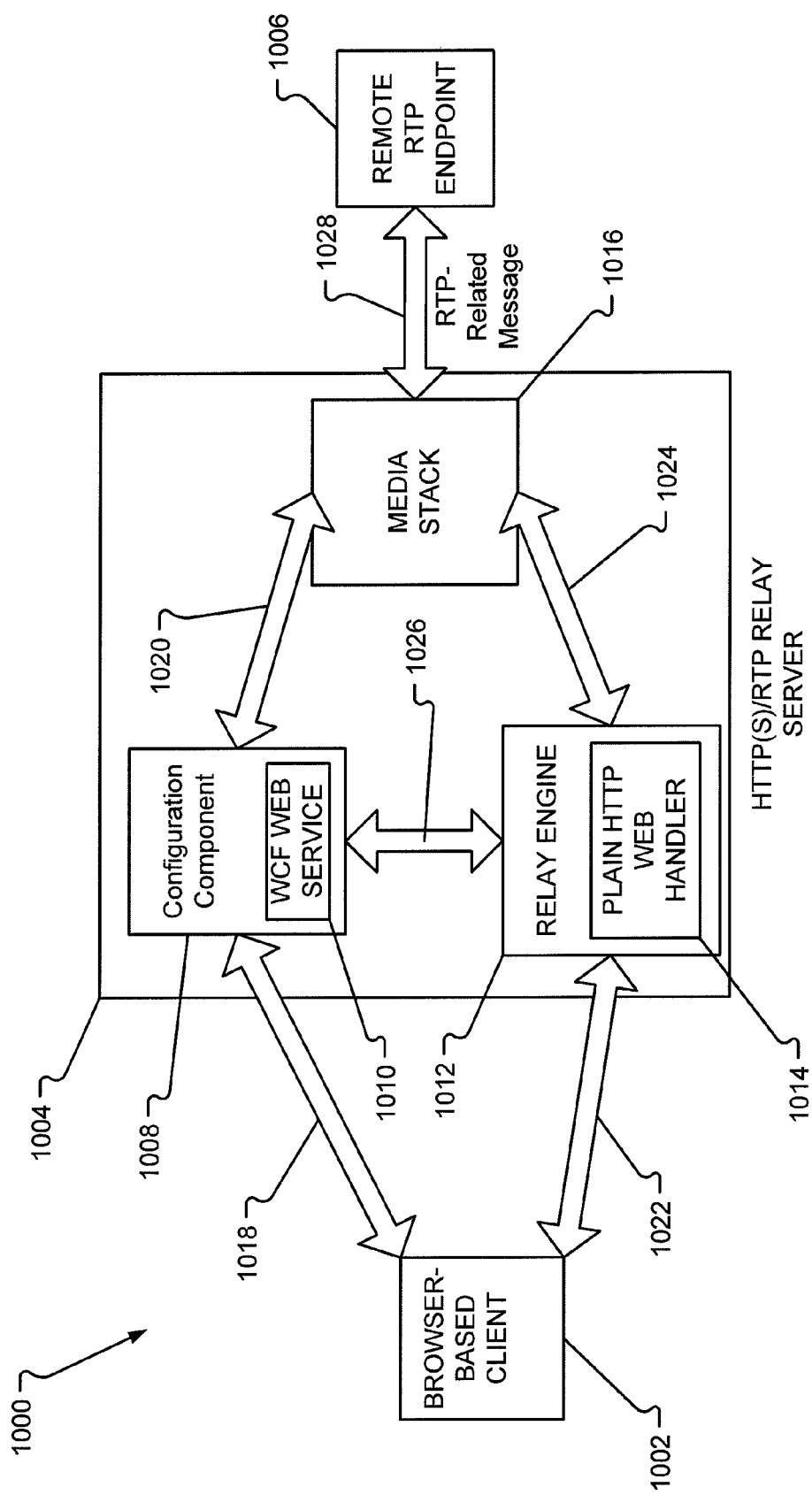
FIG. 10 illustrates a logical representation of example functional component modules of the relay server for tunneling RDP data in accordance with embodiments of the present disclosure.

Next, FIG. 10 illustrates example software functional modules 1000 for plugging a transport stack, such as a media stack, into an overall system to assist with tunneling RDP data over RTP/SRTP in accordance with an embodiment of the present disclosure. Browser-based client 1002 contacts, for example via a Web service call 1018, configuration component 1008 of relay server 1004 to configure a SRTP channel. In embodiments, configuration component 1008 comprises a Web service 1010 and interacts, through method calls 1026, for example, with relay engine 1012 for configuring a channel. Next, configuration component 1008 configures 1020 media stack 1016 loaded on relay server 1004.

Media stack 1016, among other modules, enables relay server 1004 to extend the functionality of browser-based client 1002. According to embodiments, a media stack is loaded on the relay server to permit the tunneling of certain protocols. For example, in an RDP relay scenario, to carry the RDP data via RTP/SRTP, knowledge of RTP/SRTP and Interactive Connectivity Establishment (ICE) is also used in embodiments. ICE, for example, is used to enable RTP/SRTP traffic to traverse firewalls. The relay server thus loads a media stack supporting RTP/SRTP/ICE because RDP data is typically carried to a Screen Sharing Server via RTP/SRTP. In an embodiment involving an RDP relay and setting up a connection with a Screen Sharing Server, a Web-based client communicates in SIP with the Screen Sharing Server to set up a RTP/SRTP/ICE connection between the relay server and Screen Sharing Server. The loading of the media stack for RTP/SRTP/ICE on the relay server facilitates this process. The client is then able to communicate in SIP with the Screen Sharing Server because a portion of the SIP message body, namely the Session Description Protocol (SDP) portion, is retrieved from the relay server via Web service calls. Similarly, the SDP of SIP requests from the Screen Sharing Server is passed to the relay server via Web service calls. The relay server's loading of the media stack therefore enables the transport of RDP data in environments otherwise restricted from having such transport. For example, the media stack of RTP/SRTP and ICE is typically not available in the Mac platform. In a Mac platform, for example, developers either port the media stack to native Mac or develop it in the Web-based client. However, such solutions are complex and restrictive functionality still exists with such porting and/or development.

Returning to FIG. 10, as discussed above, to carry RDP data via RTP/SRTP, knowledge of RTP/SRTP and ICE is used in embodiments. In an embodiment, such configuration involves communications to remote SIP/RTP endpoint 1006 for a connectivity check to determine if a connection can be made. In another embodiment, no connectivity check occurs. Upon configuring the SRTP channel and the media stack, client 1002 sends/receives RDP data via HTTP 1022 to relay engine 1012 comprising plain HTTP Web handler 1014 for configuring the relay session. Relay engine 1012 then communicates 1024 with media stack 1016 to obtain RDP data by exchanging RTP-related messages 1028 between media stack 1016 and remote RTP endpoint 1006. The software functional modules 1000 are offered as an example of possible software functional modules for the embodiments described. Other embodiments may include the modules depicted, fewer than the modules and/or sub-modules depicted, additional modules and/or sub-modules, combinations of modules and/or sub-modules, expansions of the modules and/or sub-modules depicted, etc.

Figure 11:
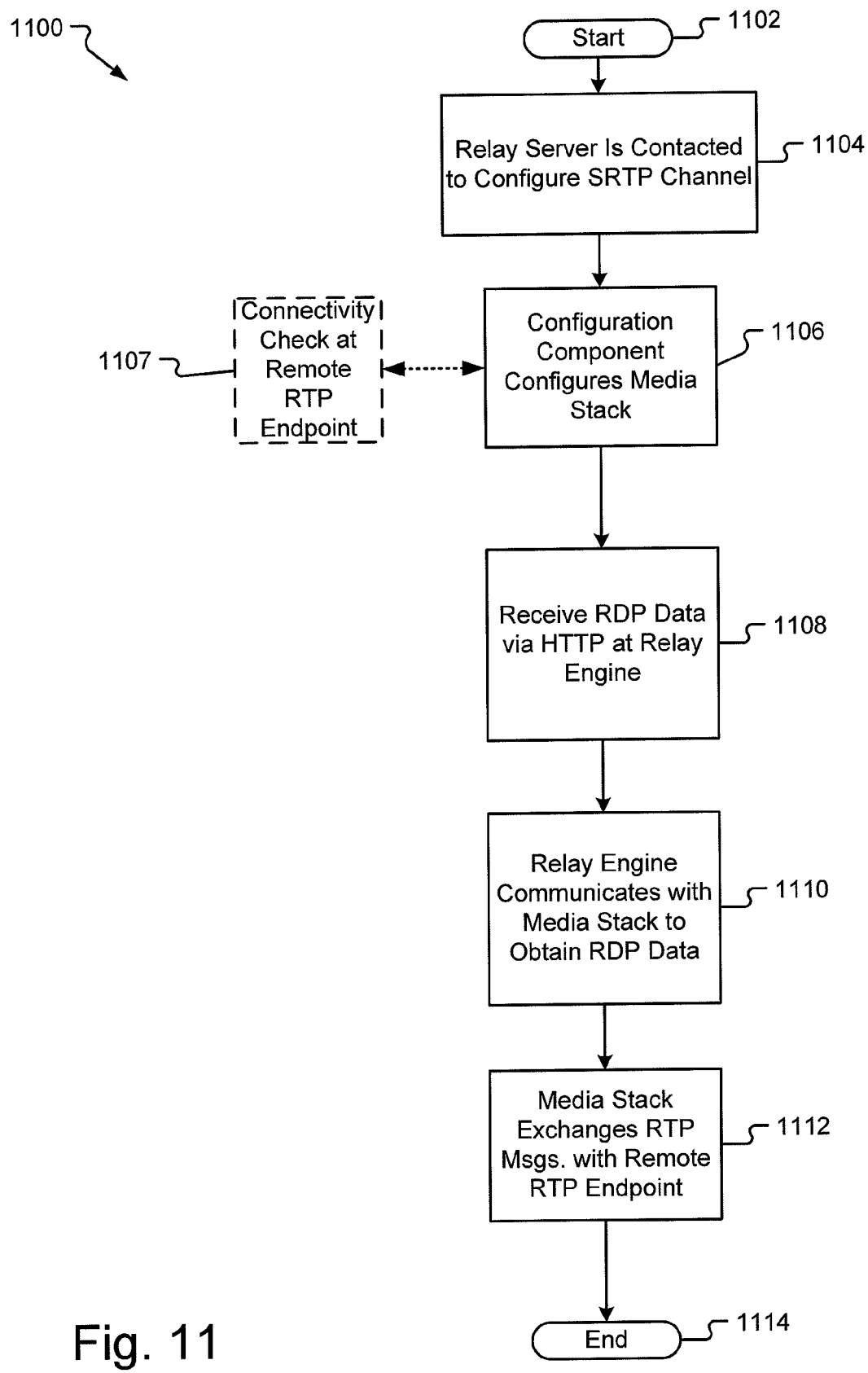
FIG. 11 depicts a flow diagram illustrating the operational characteristics of a process showing the interactions of the functional component modules depicted in FIG. 10 in accordance with an embodiment of the present disclosure.

While FIG. 10 depicts example software functional modules for plugging a transport stack, such as a media stack, into an overall system to assist with tunneling RDP data over RTP/SRTP, FIG. 11 illustrates example operational steps 1100 for tunneling RDP data over RTP/SRTP using a pluggable transport stack in accordance with an embodiment of the present disclosure. Process 1100 is initiated with START operation 1102 and proceeds to operation 1104, in which a relay server between a client and a remote RTP endpoint is contacted, such as via a Web service call, for example, to configure an SRTP channel for tunneling RDP data. Next, the configuration component configures a pluggable media stack 1106 and, in so doing, optionally (as shown by dashed lines) communicates with the remote RTP endpoint for a connectivity check 1107. The RTP endpoint responds with information as shown by the bi-directional nature of the arrow between 1106 and 1107. The client then sends/receives RDP data via HTTP to and from relay engine 1108. The relay engine, in turn, communicates with the media stack to obtain RDP data 1110. To obtain the RDP data, the media stack exchanges RTP messages with the remote RTP endpoint 1112. Process 1100 terminates at END operation 1114. FIG. 11 is an example of possible operational characteristics for tunneling RDP data over RTP/SRTP using a pluggable transport stack in accordance with embodiments disclosed herein. Operational steps depicted may be combined into other steps and/or rearranged. Further, fewer or additional steps may be used, for example.

Figure 12:
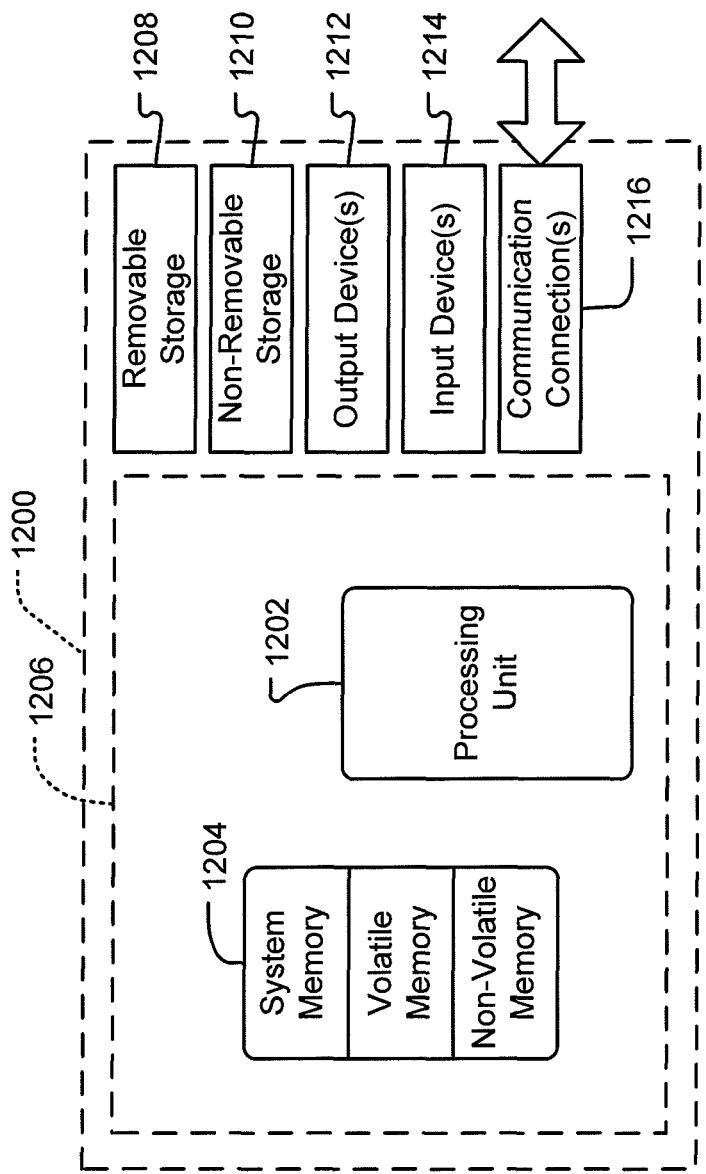
FIG. 12 depicts an example computing system upon which embodiments of the present disclosure may be implemented.

Finally, FIG. 12 illustrates an example computing system 1200 upon which embodiments disclosed herein may be implemented. A computer system 1200, such as client computer 202, relay server 206, or remote server 208, which has at least one processor 1202 for exchanging message data as shown in FIG. 2, is depicted in accordance with embodiments disclosed herein. The system 1200 has a memory 1204 comprising, for example, system memory, volatile memory, and non-volatile memory. In its most basic configuration, computing system 1200 is illustrated in FIG. 12 by dashed line 1206. Additionally, system 1200 may also include additional storage (removable and/or non-removable) including, but not limited to, magnetic or optical disks or tape. Such additional storage is illustrated in FIG. 12 by removable storage 1208 and non-removable storage 1210.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1204, removable storage 1208, and non-removable storage 1210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1200. Any such computer storage media may be part of device 1200. The illustration in FIG. 12 is intended in no way to limit the scope of the present disclosure.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

System 1200 may also contain communications connection(s) 1216 that allow the device to communicate with other devices. Additionally, to input content into the fields of a User Interface (UI) on client computer 202, for example, as provided by a corresponding UI module (not shown) on client computer 202, for example, in accordance with an embodiment of the present disclosure, system 1200 may have input device(s) 1214 such as a keyboard, mouse, pen, voice input device, touch input device, etc. Output device(s) 1212 such as a display, speakers, printer, etc. may also be included. All of these devices are well known in the art and need not be discussed at length here. The aforementioned devices are examples and others may be used.

Having described embodiments of the present disclosure with reference to the figures above, it should be appreciated that numerous modifications may be made to the embodiments that will readily suggest themselves to those skilled in the art and which are encompassed within the scope and spirit of the present disclosure and as defined in the appended claims. Indeed, while embodiments have been described for purposes of this disclosure, various changes and modifications may be made which are well within the scope of the present disclosure.

Similarly, although this disclosure has used language specific to structural features, methodological acts, and computer-readable media containing such acts, it is to be understood that the subject matter defined in the appended claims is not necessarily limited to the specific structure, acts, features, or media described herein. Rather, the specific structures, features, acts, and/or media described above are disclosed as example forms of implementing the claims. Aspects of embodiments allow for multiple client computers, multiple remote servers, multiple relay servers, and multiple networks, etc. Or, in other embodiments, a single client computer with a single remote server, single relay server, and single network are used. One skilled in the art will recognize other embodiments or improvements that are within the scope and spirit of the present disclosure. Therefore, the specific structure, acts, or media are disclosed as example embodiments of implementing the present disclosure. The disclosure is defined by the appended claims.

What is claimed is:

1. A computer-implemented method for extending functionality of a client by tunneling protocol data over a Hypertext Transfer Protocol (HTTP) through a relay server, the method comprising:
   receiving a communication at the relay server, from the client, to create a relay session with a remote endpoint;
   authenticating the client, wherein authenticating the client comprises sending challenge response data to the client;
   configuring the relay session;
   generating a session identifier for the relay session;
   sending the session identifier to the client; and
   transferring HTTP requests and responses to the client to exchange data with the remote endpoint, wherein the HTTP requests comprise the session identifier, the HTTP responses comprising negative HTTP responses, the negative HTTP responses being treated to re-try the HTTP requests and promote lossless data transmission over HTTP.

2. The method of claim 1, wherein the session identifier is used to group requests belonging to the same relay session.

3. The method of claim 2, wherein the session identifier is generated by a cryptographic random number generator.

4. The method of claim 1, wherein sequence numbers and acknowledgement numbers are assigned to HTTP requests and responses belonging to the same session.

5. The method of claim 1, wherein initial requests and responses initiate the relay session, and wherein subsequent HTTP requests transfer Session Initiation Protocol (SIP) data via HTTP to the remote endpoint via the relay server.

6. The method of claim 5, where the SIP data is transferred via HTTP onto a transport mechanism, and wherein the transport mechanism comprises one from the group consisting of: Transmission Control Protocol (TCP), User Datagram Protocol (UDP), or Transport Layer Security (TLS).

7. The method of claim 1, wherein initial requests and responses initiate the relay session, and wherein subsequent HTTP requests transfer Remote Desktop Protocol (RDP) data via HTTP to the remote endpoint via the relay server.

8. The method of claim 7, wherein the RDP data is transferred via HTTP onto a transport mechanism, and wherein the transport mechanism comprises one from the group consisting of: RTP/SRTP, TLS, UDP, or TCP.

9. One or more computer storage media not consisting of a signal, the one or more computer storage media storing computer-executable instructions that when executed by a processor perform a method for extending functionality of a client by tunneling protocol data over the Hypertext Transfer Protocol (HTTP) through a relay server, the method comprising:
   receiving a communication at the relay server, from the client, to create a relay session with a remote endpoint;
   authenticating the client, wherein authenticating the client comprises sending challenge response data to the client;
   configuring the relay session;
   generating a session identifier for the relay session;
   assigning the session identifier to the client;
   transferring HTTP requests to exchange data with the remote endpoint, wherein the HTTP requests comprise the session identifier and a sequence number, and wherein the sequence number is received by the relay server as an HTTP header;
   transferring HTTP requests and responses to the client, wherein the HTTP requests to the client comprise the session identifier, the HTTP responses comprising negative HTTP responses, the negative HTTP responses being treated to re-try the HTTP requests and promote lossless data transmission over HTTP;
   consuming, by the relay server, the sequence number;
   generating an acknowledgment number; and
   passing the acknowledgment number with an HTTP response to the client.

10. The one or more computer storage media not consisting of a signal of claim 9, further comprising:
   using the session identifier to group requests belonging to the same relay session, wherein a group of requests comprises RDP requests.

11. The one or more computer storage media not consisting of a signal of claim 9, wherein the session identifier is a GUID.

12. The one or more computer storage media not consisting of a signal of claim 9, wherein the authenticating is performed with an authentication broker at the relay server.

13. The one or more computer storage media not consisting of a signal of claim 9, wherein the protocol data tunneled over HTTP comprises arbitrary protocol data.

14. The one or more computer storage media not consisting of a signal of claim 9, wherein the protocol data comprises one or more from the group consisting of: Remote Desktop Protocol (RDP) data and Session Initiation Protocol (SIP) data.

15. The one or more computer storage media not consisting of a signal of claim 14, further comprising:
   tunneling the RDP data using a first transport mechanism; and
   tunneling the SIP data using a second transport mechanism, wherein the first transport mechanism comprises SRTP, and wherein the second transport mechanism comprises TLS.

16. A system configured to tunnel protocol data over the Hypertext Transfer Protocol (HTTP) through a relay server between a client and a remote endpoint, the system comprising:
   a processor; and
   memory coupled to the processor, the memory comprising computer program instructions executable by the processor to provide:
      a session management component within the relay server, wherein the session management component generates a session identifier (session ID) to group HTTP requests and returns the session ID to the client;
      a relay engine component within the relay server, wherein the relay engine component assigns one or more sequence numbers and one or more acknowledgment numbers to HTTP requests and responses, the HTTP responses comprising negative HTTP responses, the negative HTTP responses being treated to re-try the HTTP requests and promote lossless data transmission over HTTP;
      a platform services component within the relay server, wherein the platform services component enables authentication of the client to extend functionality of the client; and
      a plug-in transport module within the relay server, wherein the plug-in transport module supports the protocol data tunneling.

17. The system of claim 16, wherein the data tunneled over the HTTP protocol through the relay server comprises one or more from the group consisting of: SIP and RDP data.

18. The system of claim 17, wherein the data comprises SIP data, and wherein the plug-in transport module comprises one from the group consisting of: TLS/SSL, TCP, or UDP.

19. The system of claim 16, wherein arbitrary binary data is tunneled over HTTP onto a transport mechanism, and wherein the transport mechanism comprises one from the group consisting of: Real-Time Transport Protocol (RTP)/Secure Real-Time Transport Protocol (SRTP), UDP, TCP or TLS.

20. The system of claim 16, wherein the protocol data comprises RDP data, and wherein the plug-in transport module comprises one from the group consisting of: RTP/SRTP, UDP, TCP, or TLS.

* * * * *